United States Patent [19]
Kadonaga

[11] Patent Number: 5,469,198
[45] Date of Patent: Nov. 21, 1995

[54] MULTIPLE PASS PRINTING FOR ACHIEVING INCREASED PRINT RESOLUTION

[75] Inventor: Anne P. Kadonaga, Del Mar, Calif.

[73] Assignee: Hewlett-Packard Company, Palo Alto, Calif.

[21] Appl. No.: 925,715

[22] Filed: Aug. 3, 1992

[51] Int. Cl.$^6$ ........................................ B41J 2/04
[52] U.S. Cl. ............................. 347/41; 395/117
[58] Field of Search ................ 346/140 R; 395/117, 395/128; 358/445, 451; 347/37, 41, 40, 5, 9

[56] References Cited

U.S. PATENT DOCUMENTS

| | | | |
|---|---|---|---|
| 4,401,991 | 8/1983 | Martin | 346/75 |
| 4,825,389 | 4/1989 | Masaki | 364/519 |
| 4,965,593 | 10/1990 | Hickman | 346/75 |
| 5,079,563 | 1/1992 | Starkweather et al. | 346/1.1 |
| 5,093,903 | 3/1992 | Sudoh et al. | 395/102 |

FOREIGN PATENT DOCUMENTS

0422924A2  4/1991  European Pat. Off. .

Primary Examiner—Benjamin R. Fuller
Assistant Examiner—Craig A. Hallacher

[57] ABSTRACT

Techniques are disclosed for depleting raster data to provide for faster printing and also to allow printing of the depleted raster data, with a printed dot size that is larger that would otherwise be utilized with the undepleted raster data, on a pixel grid having the resolution of the undepleted raster data. Also disclosed is a technique for up scaling raster data at a particular resolution (e.g., 300 dpi) is scaled in such a manner that the upscaled raster data includes only printed pixels that correspond one-to-one with the printed pixels of the original data and wherein the relative locations of the printed pixels of the original data are maintained in the up scaled raster data. Further disclosed is a technique for printing a pixel array having a particular resolution with a print element array having print elements disposed for printing at a lesser resolution.

13 Claims, 17 Drawing Sheets

CARRIAGE SCAN

| | 1 | 2 | 3 | 4 |
|---|---|---|---|---|
| 1 | X | | | |
| 2 | | X | | |
| 3 | X | | | |
| 4 | | X | | |
| 5 | | | X | |
| 6 | | X | | |
| 7 | | | X | |
| 8 | | X | | |
| 9 | | | X | |
| 10 | | | | X |
| 11 | | | X | |
| 12 | | | | X |
| 13 | | | | |
| 14 | | | | X |
| 15 | | | | |
| 16 | | | | X |

PIXEL ROW

FIG. 22

MULTIPLE PASS PRINTING FOR ACHIEVING INCREASED PRINT RESOLUTION

BACKGROUND OF THE INVENTION

The subject invention is generally directed to swath type printers, and more particularly to apparatus and techniques for reducing pixel density to allow for higher resolution printing with print elements designed for lower resolution printing.

A swath printer is a raster or matrix type printer that is capable of printing a plurality of rows of dots in a single scan of a movable print carriage across the print media. The possible locations for dots that can be printed by a raster printer can be represented by an array or grid of pixels or square areas arranged in a rectilinear array of rows and columns wherein the center to center distance or dot pitch between pixels is determined by the resolution of the printer. For example, if a printer is capable of printing 300 dots per inch (dpi), the dot pitch of the pixel array would be 1/300th of an inch.

The print carriage of a swath printer typically includes a plurality of printing elements (e.g., ink jet nozzles) displaced relative to each other in the media motion direction which allows printing of a plurality of rows of dots. Depending upon application, the separation between the printing elements in the media scan direction can correspond to the dot pitch for the highest or finest resolution at which the printer can operate (e.g., 1/300th of an inch for 300 dot per inch (dpi) resolution). The printing elements of a swath printer are commonly implemented in a printhead such as a thermal ink jet printhead that is integral to a replaceable ink jet printhead cartridge.

The quality of the printed images produced by a raster printer depends to large degree on the resolution of the printer. Higher or finer resolution wherein the printed dots are more closely spaced provides for higher quality images.

A consideration with increasing the resolution of ink jet printers is that increased resolution requires more printed dots per unit area, with the number of dots increasing by the product of the increase factor along each dimension. For example, doubling print resolution from 300 dpi to 600 dpi results in four times as many dots per unit area. Since the number of dots per unit area increases with resolution, the size of each printed dot must decrease with increased resolution in order to avoid saturating the print media. For example, if a 300 dpi ink jet cartridge were utilized to print at 600 dpi, the amount of ink per unit area would increase by a factor of four, just as the number of dots increased. However, the design and implementation of higher resolution ink jet cartridges with reduced dot size may be impractical, and moreover the use of reduced dot size ink jet cartridges may also present difficulties in printing at reduced pixel densities that would be conveniently utilized for increased throughput in those situations where the reduced pixel densities would be acceptable, such as drafts.

SUMMARY OF THE INVENTION

It would therefore be an advantage to provide a thermal ink jet printer that processes raster data so that it can be printed with ink jet cartridges designed for a resolution that is lower than the resolution of the raster data to be printed.

The foregoing and other advantages are provided by the invention in a printing procedure wherein an ink jet cartridge having a dot pitch at a particular resolution (e.g., 300 dpi) is utilized to provide printing on a grid having twice the resolution (i.e., 600 dpi for the particular example of a 300 dpi cartridge).

BRIEF DESCRIPTION OF THE DRAWINGS

The advantages and features of the disclosed invention will readily be appreciated by persons skilled in the art from the following detailed description when read in conjunction with the drawing wherein:

FIG. 22 is a table that illustrates the sequence in which pixel rows are printed with a nozzle array having a nozzle pitch that is twice the pitch of the pixel rows.

DETAILED DESCRIPTION OF THE DISCLOSURE

Figure 1:
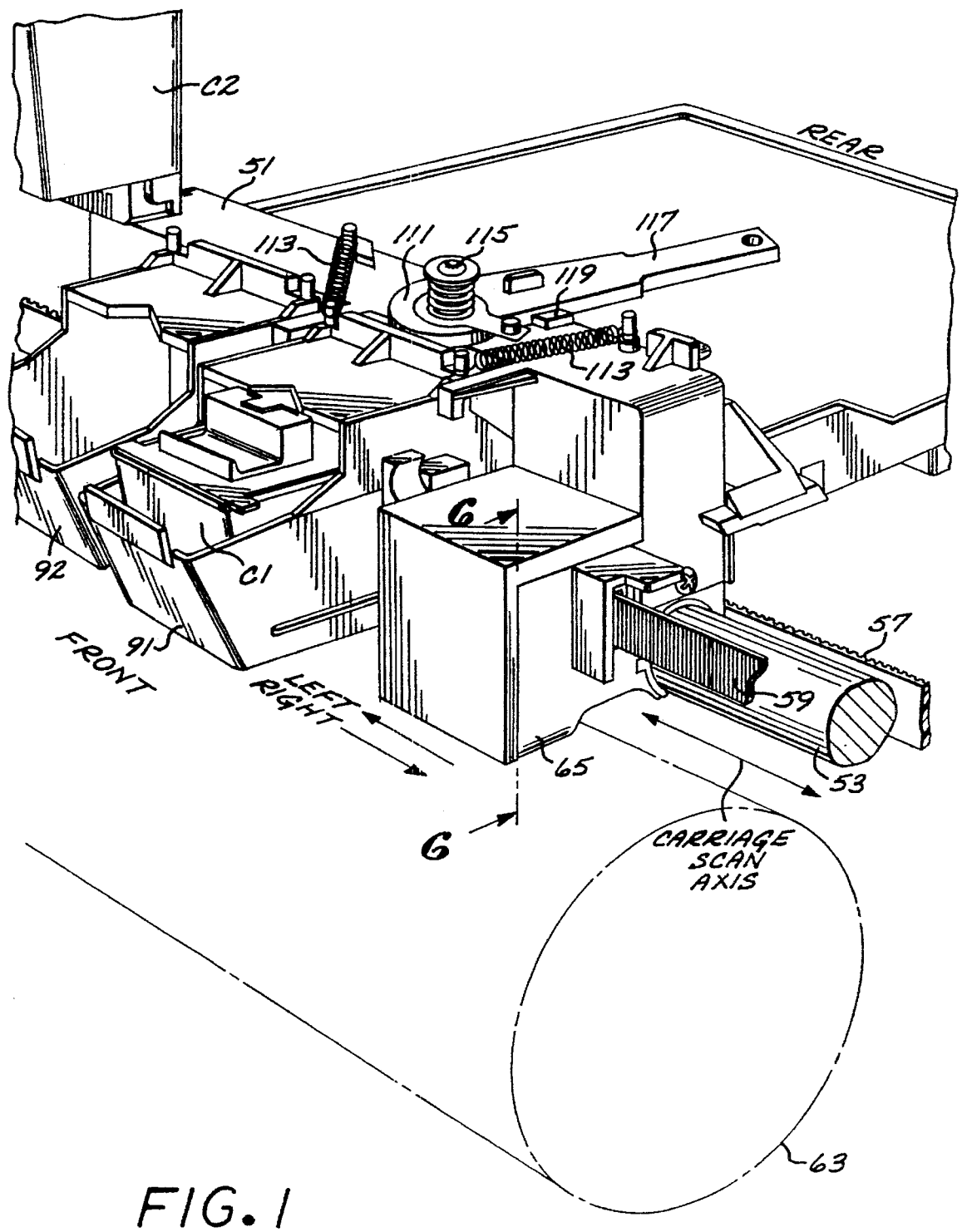
FIG. 1 is a schematic perspective view of the major mechanical components of a thermal ink jet printer employing the disclosed print techniques.

In the following detailed description and in the several figures of the drawing, like elements are identified with like reference numerals.

The invention is generally directed to techniques by which the raster data for an image is depleted in a predetermined manner whereby selected pixels that are on are turned off, so as to prevent printing of dots that are too close together. Pursuant to raster data depletion, a higher print resolution is achieved with a printed dot size that is utilized for lower print resolution, and faster printing can be achieved while maintaining the print resolution for the depleted raster data. Also disclosed is a technique by which a depleted high resolution image raster is printed with a cartridge designed for printing at a lower resolution.

Referring now to FIG. 1, set forth therein is a schematic frontal quarter perspective view depicting, by way of illustrative example, major mechanical components of a multiple printhead ink jet printer in which the techniques of the invention can be implemented. The printer includes a movable carriage 51 mounted on guide rails 53, 55 for translational movement along the carriage scan axis (commonly called the Y-axis in the printer art). The carriage 51 is driven along the guide rails 53, 55 by an endless belt 57 which can be driven in a conventional manner, and a linear encoder strip 59 is utilized to detect position of the carriage 51 along the carriage scan axis, for example in accordance with conventional techniques.

Figure 2:
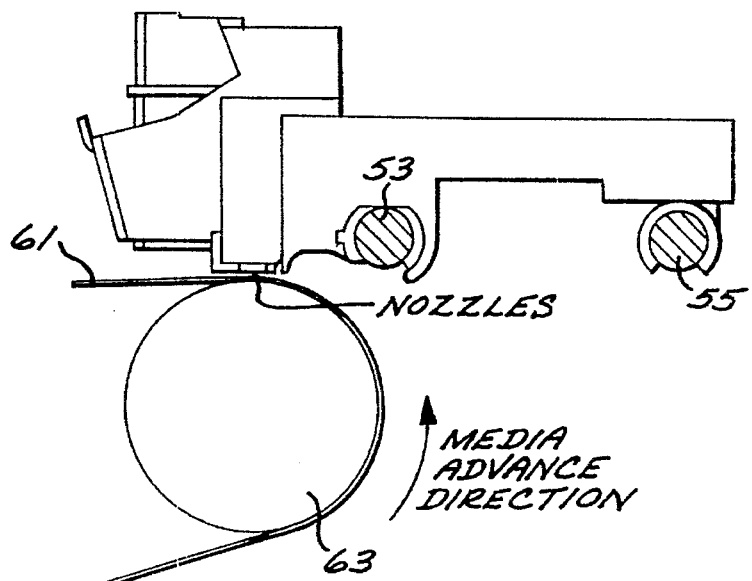
FIG. 2 is a schematic side elevational sectional view illustrating the relation between the downwardly facing ink jet nozzles and the print media of the printer of FIG. 1.
Figure 5:
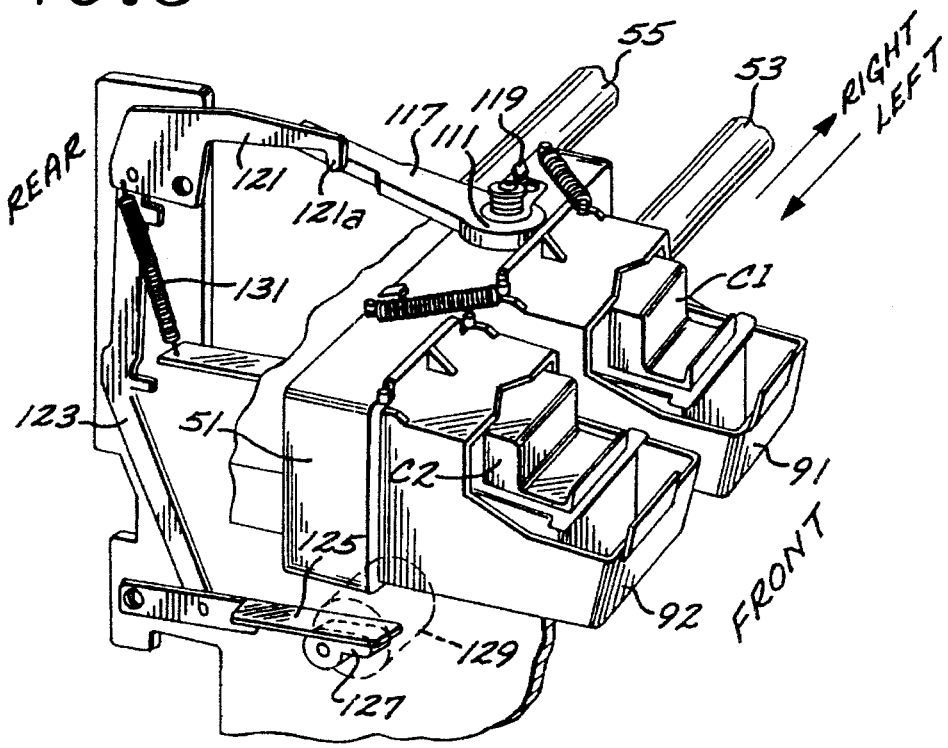
FIG. 5 is a detail view illustrating an example of a cam actuating mechanism for adjusting the position adjusting cam of the positionally adjustable printhead cartridge retaining shoe of FIG. 4.

The carriage 51 supports first and second cartridge retaining shoes 91, 92 located at the front of the carriage for retaining substantially identical removable first and second ink jet printhead cartridges C1, C2 (sometimes called "pens," "print cartridges, or cartridges"). FIG. 1 shows the cartridge C2 in a removed condition, while in FIG. 5 shows the cartridge C2 in its installed position. As depicted in FIG. 2, the printhead cartridges C1, C2 include downwardly facing nozzles for ejecting ink generally downwardly to a print media 61 which is supported on a print roller 63 that is generally below the printhead cartridges.

For reference, the print cartridges C1, C2 are considered to be on the front of the printer, as indicated by legends on FIG. 1, while left and right directions are as viewed while looking toward the print cartridges, as indicated by labelled arrows on FIG. 1. By way of example, 35 the print media 61 is advanced while printing or positioning so as to pass from beneath the cartridge nozzles toward the front of the printer, as indicated on FIG. 2, and is rewound in the opposite direction.

Figure 3:
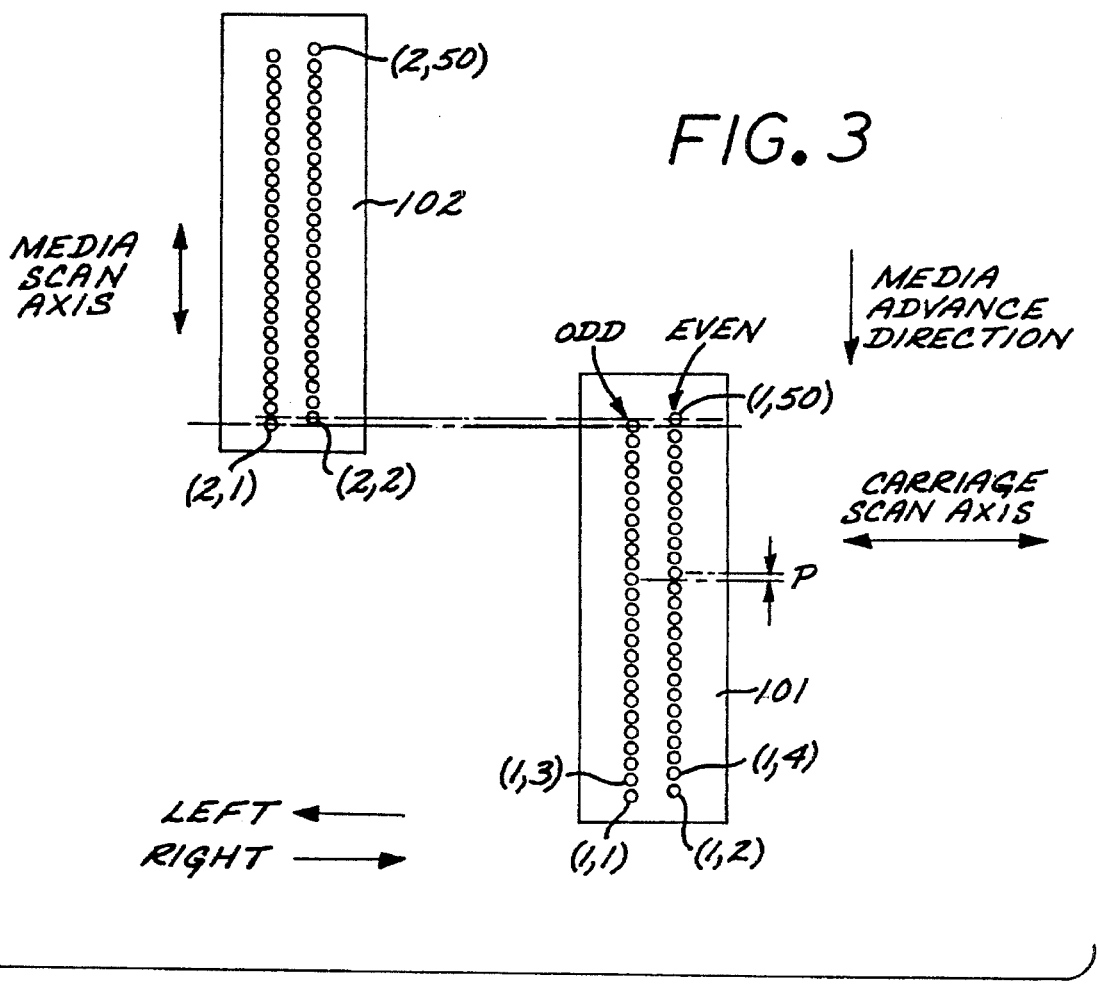
FIG. 3 is a schematic plan view illustrating the general arrangement of the nozzle arrays of the printhead cartridges of the printer of FIG. 1.

A media scan axis (commonly called the X-axis) as shown in FIG. 3 will be utilized as a reference for displacement of the media, as well as a reference for orientation of a line. The media scan axis can be considered as being generally tangential to the print media surface that is below the nozzles of the printhead cartridges and orthogonal to the carriage scan axis. In accordance with prior usage, the media scan axis is conveniently called the "vertical" axis, probably as a result of those printers having printing elements that printed on a portion of the print media that was vertical. Also in accordance with known usage, the carriage scan axis is conveniently called the "horizontal axis". From a practical viewpoint, if the printed output of the printer of FIG. 1 were placed vertically in front of an observer in the same orientation as it would hang down from the print roller 63, a line printed by with a single ink jet nozzle and media movement rather than carriage movement would be "vertical," while a line printed with a single ink jet nozzle and carriage movement rather than media movement. If the print media containing such lines were positioned horizontally in front of an observer, the line that extends away from the observer can be considered vertical by common convention; and the line that extends sideways as to the observer can be considered horizontal by common convention.

FIG. 3 schematically depicts the arrangement of the nozzle plates 101, 102 of the first and second cartridges C1, C2 as viewed from above the nozzles of the cartridges (i.e., the print media would be below the plane of the figure). Each nozzle plate includes an even number of nozzles arranged in two columns wherein the nozzles of one column are staggered relative to the nozzles of the other column. By way of illustrative example, each nozzle plate is shown as including an array of 50 nozzles which are numbered as (a,1) through (a,50) starting at the lower end of the nozzle array with nozzles in the left column being the odd numbered nozzles and the nozzles in the right column being the even numbered nozzles, where "a" represents the printhead cartridge number. The distance along the media scan axis between diagonally adjacent nozzles, as indicated by the distance P in FIG. 3, is known as the nozzle pitch, and by way of example is equal to the resolution dot pitch of a dot resolution (e.g., $\frac{1}{300}$ inch for 300 dpi) for which the cartridge has been designed. In use, the physical spacing between the columns of nozzles in a printhead is compensated by appropriate data shifts in the swath print data so that the two columns function as a single column of nozzles.

Figure 4:
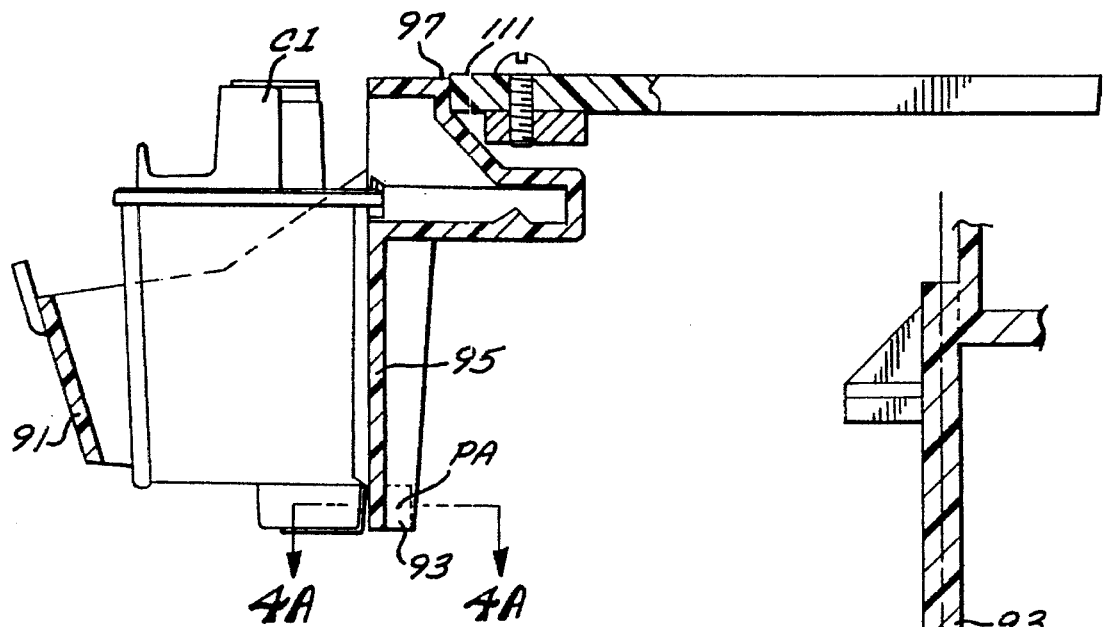
FIG. 4 and FIG. 4A are detail views of a positionally adjustable printhead cartridge retaining shoe of the swath printer of FIG. 1.
Figure 4A:
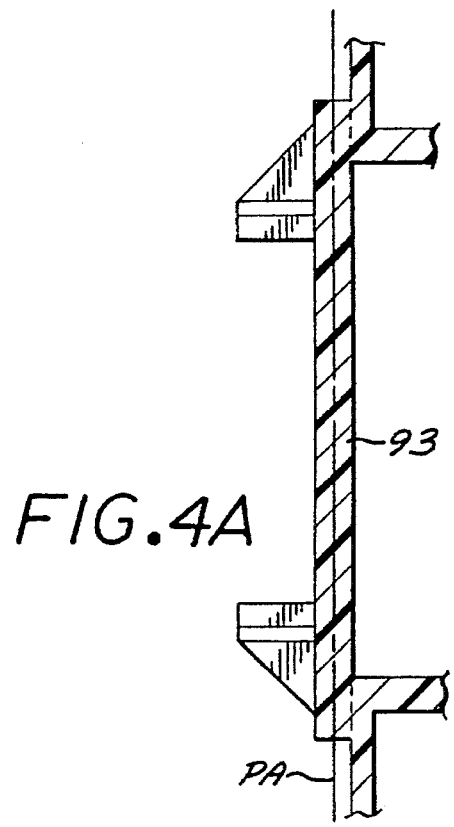

The first and second cartridges C1, C2 are side by side along the carriage scan axis and are offset relative to each other along the media scan axis. The second retaining shoe 92 is fixedly secured to the carriage 51, while the first cartridge retaining shoe 91 is pivotally secured to the carriage 51 by a flexurally deformable, torsion bar like support member 93 located at the lower rear part of the retaining shoe 91 near the plane of the nozzle plate of the first printhead cartridge C1 and generally parallel to the carriage scan axis, as shown in FIGS. 4 and 4A. By way of illustrative example, the torsion bar like support member 93 is integrally formed with a backplate 95 of the first cartridge retaining shoe 91 and with a portion of the carriage frame, such that the first retaining shoe 91 is pivotable about a pivot axis PA that passes through the torsion bar like support member 93. The top of the first cartridge retaining shoe 91 includes a cam follower flange 97 that is structurally integral with the back plate 95 of the retaining shoe. As further shown in FIG. 5 the cam follower flange 97 is biased rearwardly against a position adjustment cam 111 by a pair of retaining springs 113 which are connected between the top of the carriage and the top of the first retaining shoe.

The adjustment cam 111 is rotatably mounted on a pin 115 on the carriage 51 and is shaped so as to increase the distance between the cam pin 115 and the retaining shoe flange 97 with increased counterclockwise rotation of the cam, as viewed from above. The cam is rotated by a cam lever 117 that is integral with the cam, and is engageable with a right cam stop 119 which limits the clockwise rotation of the cam. Thus, as the cam lever 117 is rotated counterclockwise away from the cam stop 119, the nozzle plate 101 of the first cartridge C1 is rotated downward about the pivot axis PA, which aims the nozzle plate of the first cartridge so that its print area is closer to the print area of the second cartridge along the media scan axis. Rotation of the adjustment cam 111 in the counterclockwise direction as viewed from above effectively positions the first print cartridge C1 closer to the second print cartridge C2.

The adjustment cam 111 is controllably moved pursuant to movement of the carriage 51 while the cam lever 117 is engaged against the downwardly extending tab 121a of a conveniently located pivoted adjustment lever arm 121 that can be pivoted so that the tab 121a is in or above the path of the cam lever 117 as the cam lever 117 moves with the carriage 51. As shown in FIG. 5, the cam actuator arm 121 can be in the proximity of one end of the carriage guide rails, and is actuated by an actuating lever 123 that is driven by a cam follower 125 which in turn is controlled by a cam 127 on the output of a stepper motor 129. A bias spring 131 ensures that the cam actuator arm 121 is fully raised when actuated to be in the raised position.

It should be appreciated that the cam actuator arm 121 can be controlled by other mechanisms, and that the stepper motor 129 can be used of additional purposes. The use of an actuator arm 121 and carriage displacement relative to the actuator arm 121 for cam adjustment avoids the use a separate servo motor for cam adjustment.

In use, the printhead cartridges C1, C2 are mechanically and electronically aligned so that the two printhead cartridges C1, C2 cooperatively function like a single printhead having a single column array of nozzles spaced apart along the media axis by the nozzle pitch P, as disclosed in commonly assigned U.S. application Ser. No. 07/785,650, filed Oct. 31, 1991 by Haselby and Nguyen, entitled "PRINT CARTRIDGE ALIGNMENT IN PAPER AXIS," incorporated herein by reference; and commonly assigned U.S. application Ser. No. 07/786,326, filed Oct. 31, 1991 by Chen, Corrigan and Haselby, entitled "FAST FLEXIBLE PRINTER/PLOTTER WITH ALIGNMENT CORRECTION," incorporated herein by reference.

Figure 6:
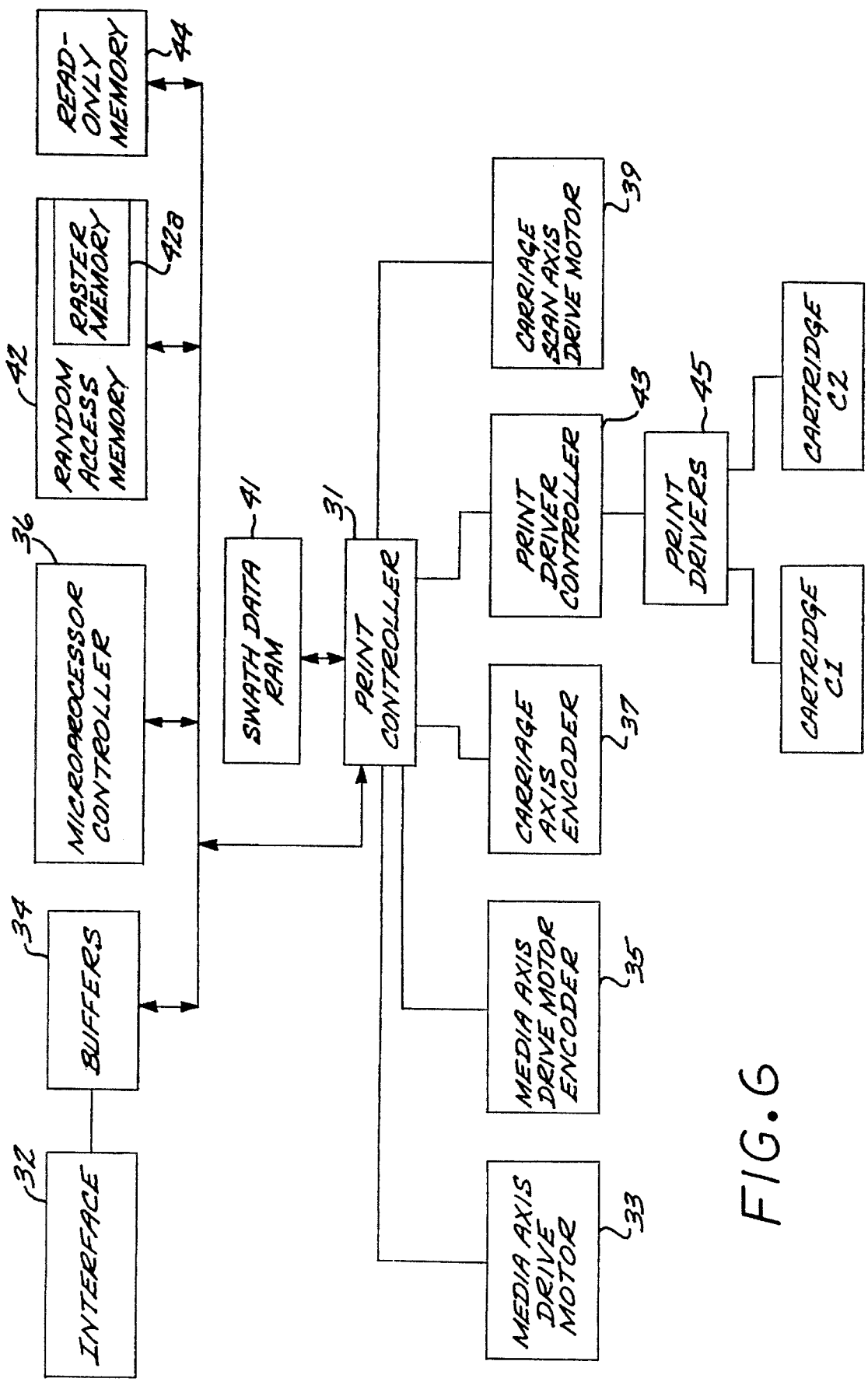
FIG. 6 is a simplified block diagram of a printer control system for controlling the swath printer of FIG. 1.

Referring now to FIG. 6, set forth therein is a simplified block diagram of a control system for controlling the thermal ink jet printer of FIG. 1 in which the techniques of the invention can be implemented. The control system includes an interface 32 which receives print data from a host computer, for example, and stores the print data in a buffer memory 34. A microprocessor controller 36 is configured to process the print data to produce raster data that is stored in a bit-map memory 42a contained in a random access memory (RAM) 42 provided for the use of the microprocessor controller. A read-only memory 44 is also provided as appropriate for the use of the microprocessor controller 36. Processes in accordance with the invention, as described further herein, can be performed by the microprocessor controller 36 in conjunction with look-up tables contained in the read-only memory 44.

A print controller 31 transfers portions of the raster data from the bit-map memory 42a to a swath memory 41 and provides swath data to a printhead driver controller 49 which controls printhead drivers 45 that drive the ink firing elements of the ink jet cartridges C1, C2. The print controller 31 further controls a media axis driver motor 33 which moves the print roller 63 pursuant to media motion commands from the print controller 31. A media axis drive motor encoder 35 provides information for the feedback control of the media axis driver motor 33. Similarly, a carriage axis encoder 37 provides feedback information for the feedback control of a carriage scan axis drive motor 39 which positions the ink jet cartridge supporting carriage 51 pursuant to carriage motion commands from the print controller 31.

Figure 7:
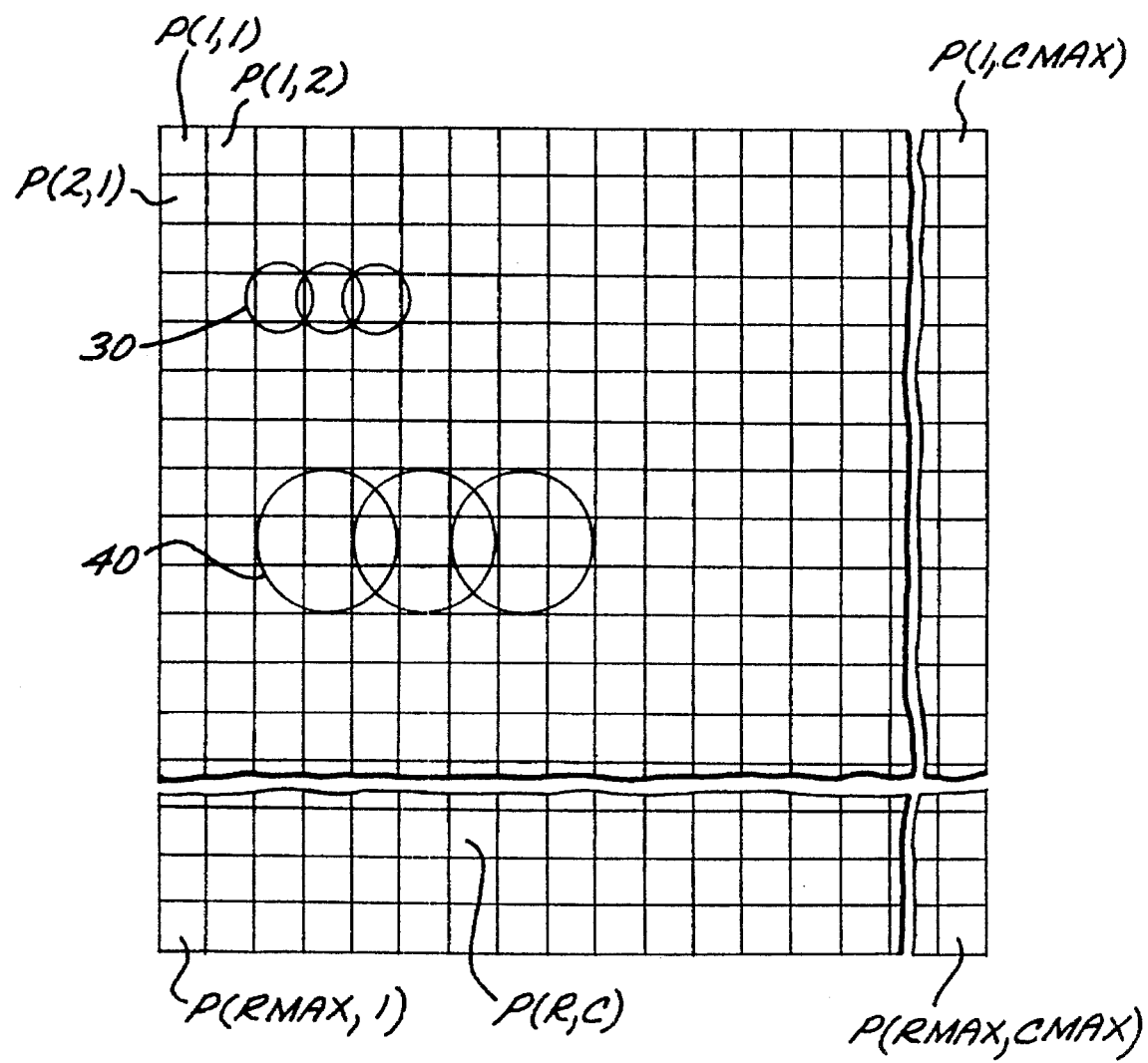
FIG. 7 schematically illustrates a pixel array on which dots can be selectively printed by the printer to form a printed image, and further schematically illustrates printed dots of different sizes.

In discussing the printing of dots onto a print medium, the area to be printed is commonly characterized as an array of pixels on which the printer can selectively print dots to form the desired image, and FIG. 7 schematically illustrates a portion of a two dimensional grid or array of pixels P(1,1) through P(RMAX,CMAX) each of which defines a location on a two dimensional print medium where a dot can be printed. The pixels P are squares arranged in rows and columns in a rectilinear array, wherein each row is represented as extending horizontally and each column is represented as extending vertically, and each pixel P(R,C) has a corresponding location in the bit-map raster memory 42a contained in main RAM 42, such that there is a one-to-one correspondence between locations in the raster memory 42a and the pixel array to be printed. For the particular example of a binary printing, the data for each pixel comprises a binary bit that defines whether or not a dot is to be printed at that pixel. For ease of reference, in this disclosure a pixel bit contains a 1 if a dot is to be printed on the corresponding pixel, but it should be appreciated that a 0 can be utilized to indicate that a dot will be printed, depending upon implementation.

By way of reference, the horizontal or row dimension of the pixel array corresponds to the carriage axis, while the vertical or column dimension of the pixel array corresponds to the media axis, and each of the pixels P(R,C) in the grid of FIG. 7 is uniquely identified by an ordered pair of numbers (R,C) wherein R is the row in which the pixel is located and C is the column in which the pixel is located. For convenience, the rows are number 1 through RMAX starting with the top row, and the columns are numbered 1 through CMAX starting with the leftmost column. Thus, the pixel at the top left corner is pixel P(1,1). The number of pixels per unit of horizontal distance is referred to as the horizontal resolution, and is commonly expressed in "dots per inch" or dpi, for example 300 dpi or 600 dpi. The vertical resolution can be similarly expressed.

The bit-mapped raster data for the pixel array is logically organized to correspond to the rows and columns of the physical arrangement of the printed pixel array, although in accordance with conventional bit mapping techniques the bit-mapped raster data for an array of pixels does not necessarily have to be in the form of rows and columns. Thus, the schematic representation of the pixel array or grid also represents the bit-map raster data that defines the printed state of each of the pixels in the pixel array. For convenience each of the raster data bits for a pixel array will also be identified as P(R,C) since a pixel necessarily includes an associated one-bit data location in the bit-map memory, and it will be clear from the context as to whether the pixel or the data is being referenced.

Dots printed at pixel locations generally comprise roughly circular dots generally centered on the pixel locations for which the dots are intended. In known raster printers, the size of the printed dot is selected to be slightly larger than the pixel size, as represented in FIG. 7 by circles 30 on a plurality of horizontally adjacent pixels.

In accordance with one aspect of the printer disclosed herein, a draft mode of printing is provided wherein raster data at a particular resolution (e.g., 300 dpi) is depleted along the horizontal axis and then printed on a grid that corresponds to that particular resolution with a dot size intended for that resolution. In this manner, for the same ink drop firing frequency as would be utilized with the non-depleted raster data, the carriage that supports the ink jet cartridges can be scanned at a higher rate, which provides for faster printing of the horizontally depleted raster data.

In accordance with another aspect of the printer disclosed herein, enhanced mode raster data depletion is provided wherein the image raster data at a particular resolution (e.g., 600 dpi) is depleted so that the depleted image raster data can be printed on a raster grid having the particular resolution with dots that are larger than would otherwise be utilized with the particular resolution, as represented in FIG. 7 by circles 40 on a plurality of horizontal pixels that are respectively separated from each other by one pixel. By way of illustrative example, raster data for a 600 dpi grid is depleted so that it can be printed on a 600 dpi grid with a dot size intended for a 300 dpi grid. Since a 300 dpi dot has four times the area of a 600 dpi dot, printing a 600 dpi image with 300 dpi dots would result in about four times as much ink in comparison to printing the same image with 600 dpi dots, which would unacceptably saturate the printing medium. For the particular example of printing a 600 dpi image with 300 dpi dots, a technique in accordance with the invention depletes the 600 dpi raster data so that the depleted raster data can be printed on a 600 dpi grid with 300 dpi dots with the appropriate amount of ink.

In accordance with further aspect of the printer disclosed herein, raster data at a particular resolution (e.g., 300 dpi) is scaled up to a higher resolution (e.g., 600 dpi) in such a manner that the expanded data does not require depletion for printing at the higher resolution with a dot size intended the lower resolution, and which locates the printed pixels on the higher resolution grid at locations such that the relation between the dots printed at the higher resolution is the same as the relation between the dots that would have been printed at the lower resolution. In other words, the expansion of the raster data to a higher resolution results in the printed pixels being located at the same locations relative to each other as if the unexpanded raster data were printed on the lower resolution grid that corresponds to the unexpanded raster data. This allows raster data at particular resolution to be combined with higher resolution raster data for printing in accordance with the enhanced mode of operation.

In accordance with yet another aspect of the printer disclosed herein, a printing procedure is provided by which an ink jet cartridge having a dot pitch at a particular resolution (e.g., 300 dpi) is utilized to provide printing on a grid having twice the resolution (i.e., 600 dpi for the particular example of a 300 dpi cartridge).

Draft Mode Depletion

Draft mode depletion is directed to depleting raster data along the horizontal axis so that in each row of pixels, each printed pixel must be separated by at least one pixel from another printed pixel, whereby a printed pixel will not have an immediately adjacent printed pixel that is in the same row. This allows for faster printing while introducing minimal artifacts to the printed output. Preferably, draft mode horizontal depletion is performed on raster data that is to be printed with a dot size that corresponds to the resolution of the raster data. For example, 300 dpi raster data that is to be printed with 300 dpi dots can be horizontally depleted in accordance with the invention to advantageously achieve faster throughput while printing on a 300 dpi pixel array.

Figure 8:
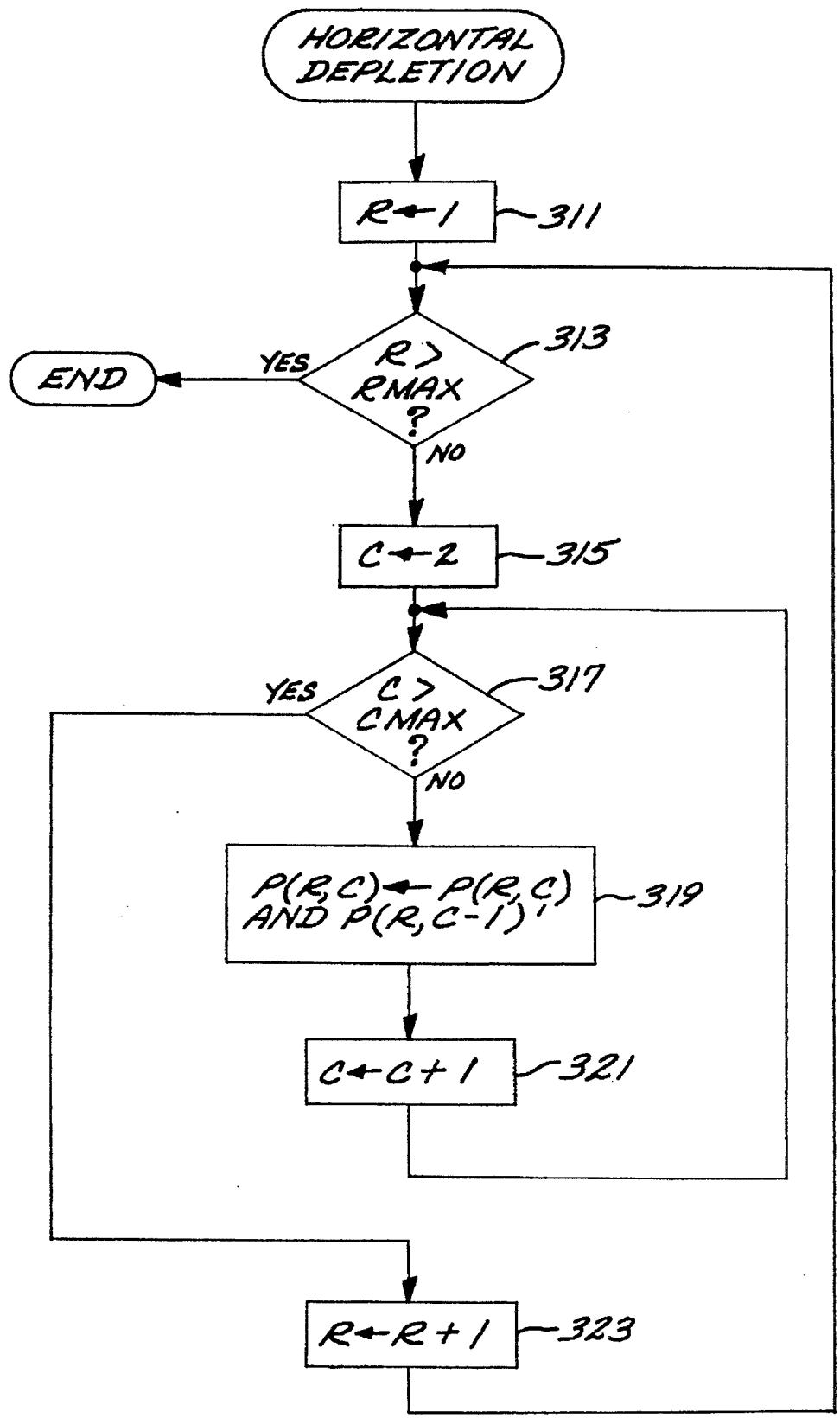
FIG. 8 sets forth a flow diagram of a procedure for performing horizontal depletion of raster data.

In terms of a raster defined by a coordinate system having its origin at the upper left corner as shown in FIG. 7, horizontal axis depletion can be performed on each row, for example, by sequentially examining each pixel starting with the second pixel from the left and turning off each pixel that has an "on" pixel to its left. Alternatively, horizontal axis depletion can be performed by sequentially examining each pixel starting with the second pixel from the right and turning off each pixel that has an "on" pixel to its right. FIG. 8 sets forth by way of illustrative example a flow diagram of a procedure for performing horizontal depletion on each of the RMAX rows of a raster data array, wherein depletion proceeds from left to right. At 311 a row index R is initialized to 1, and at 313 a determination is made as to whether the row index R has exceeded the number of rows RMAX. If the determination is no, the row index R has not been exceeded the highest row number RMAX, a column index C is initialized to 2 at 315. At 317 a determination is made as to whether the column index C has exceeded the number of columns CMAX. If no, at 319 the pixel bit P(R,C) is replaced with the result of the bitwise binary ANDing the present contents of the pixel bit P(R,C) with the binary 1's complement of the contents of the pixel bit P(R,C-1), which is to the left of the pixel bit P(R,C). It is noted that an apostrophe (') is used in the figures and in the written description to denote the binary 1's complement. At 321 the column index C is incremented by one, and processing transfers to 317 where the column index C is checked as to whether it has exceeded the number of columns CMAX.

If the determination at 317 is yes, the column index C has exceeded the number of columns CMAX, control transfers to 323 where the row count R is incremented by one. Control then transfers to 313 where the row index R is checked to determine whether it has exceeded the number of rows RMAX. If the determination at 313 is yes, the row index R has exceeded the number of rows RMAX, the procedure ends.

Figure 9:
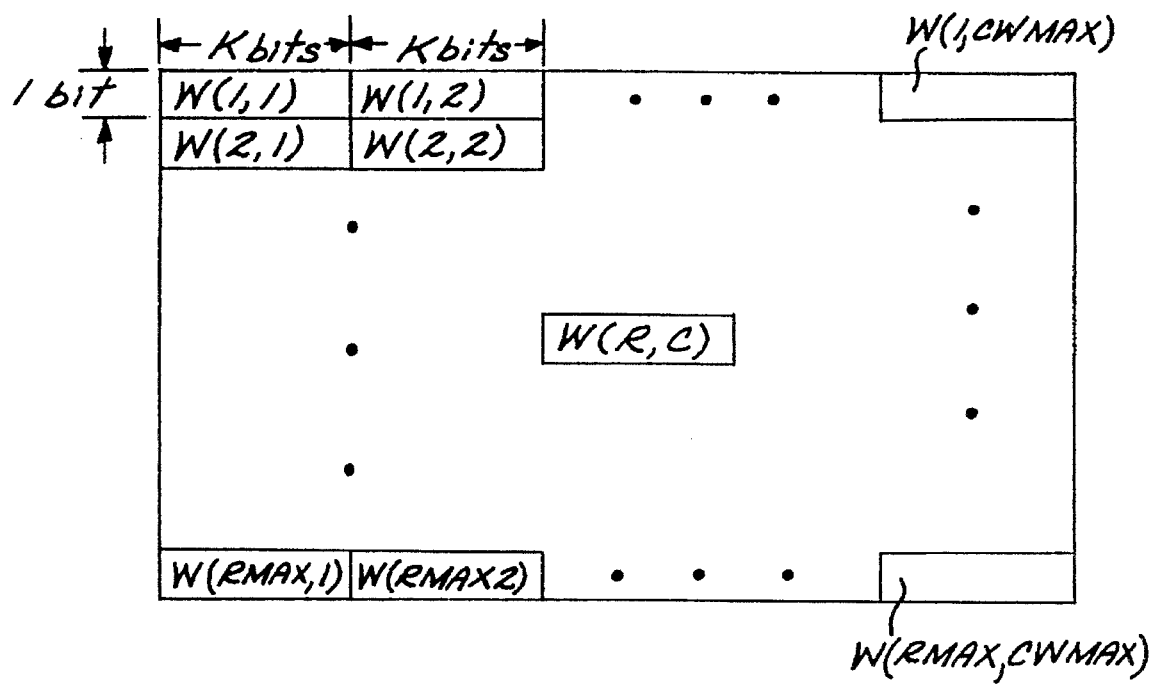
FIG. 9 schematically illustrates the organization of raster data into an array of K-bit wide words for horizontal depletion.
Figure 10:
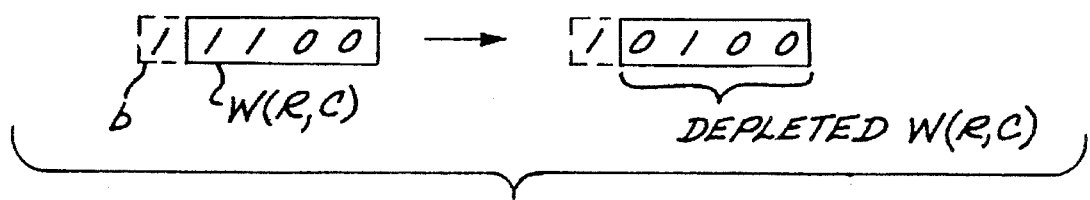
FIG. 10 schematically illustrates an example of horizontal depletion of a word of raster data by use of a look-up table.

By way of particular illustrative example, the horizontal depletion procedure of FIG. 8 can be implemented by implementing a depleter look-up table in the read-only memory of the printer control system of FIG. 6 and organizing each row of raster data as a sequence of immediately adjacent, non-overlapping K-bit words W(R,CW) as shown in FIG.9, wherein R is the row position and C is the column position of a K-bit word W(R,C) in the array of K-bit words. Starting with the leftmost K-bit word in a given row, each K-bit word is replaced with a K-bit word retrieved from the depleter table that is accessed with a depleter table index I which is the composite binary value of a (K+1)-bit word comprised of the present contents of the K-bit word to be horizontally depleted and one of the immediately bits on either side of the K-bit word, where the particular additional bit depends on the order in which the K-bit words are replaced, and wherein the left most bit of the (K+1)-bit word is the most significant bit. For the particular example of depletion being performed in the sequence starting from left to right, the additional bit for forming the index I is the immediately adjacent bit to the left of the word to be replaced, with the additional bit being a 0 for each of the words W(R,1) in the leftmost column of the array of K-bit words. FIG. 10 schematically illustrates the results of horizontal depletion of a 4-bit word W(R,C) whose replacement is retrieved by accessing the depleter table with an index I formed of the 4-bit word and the bit b which is the immediately adjacent bit to the left of the 4-bit word W(R,C). Thus, for the particular example of K-bit word replacement being performed from left to right, the additional bit of the depleter table index I for each word includes the rightmost bit from the prior in sequence depleted word, except for the leftmost word whose depleter table index I includes a leading 0.

Figure 11:
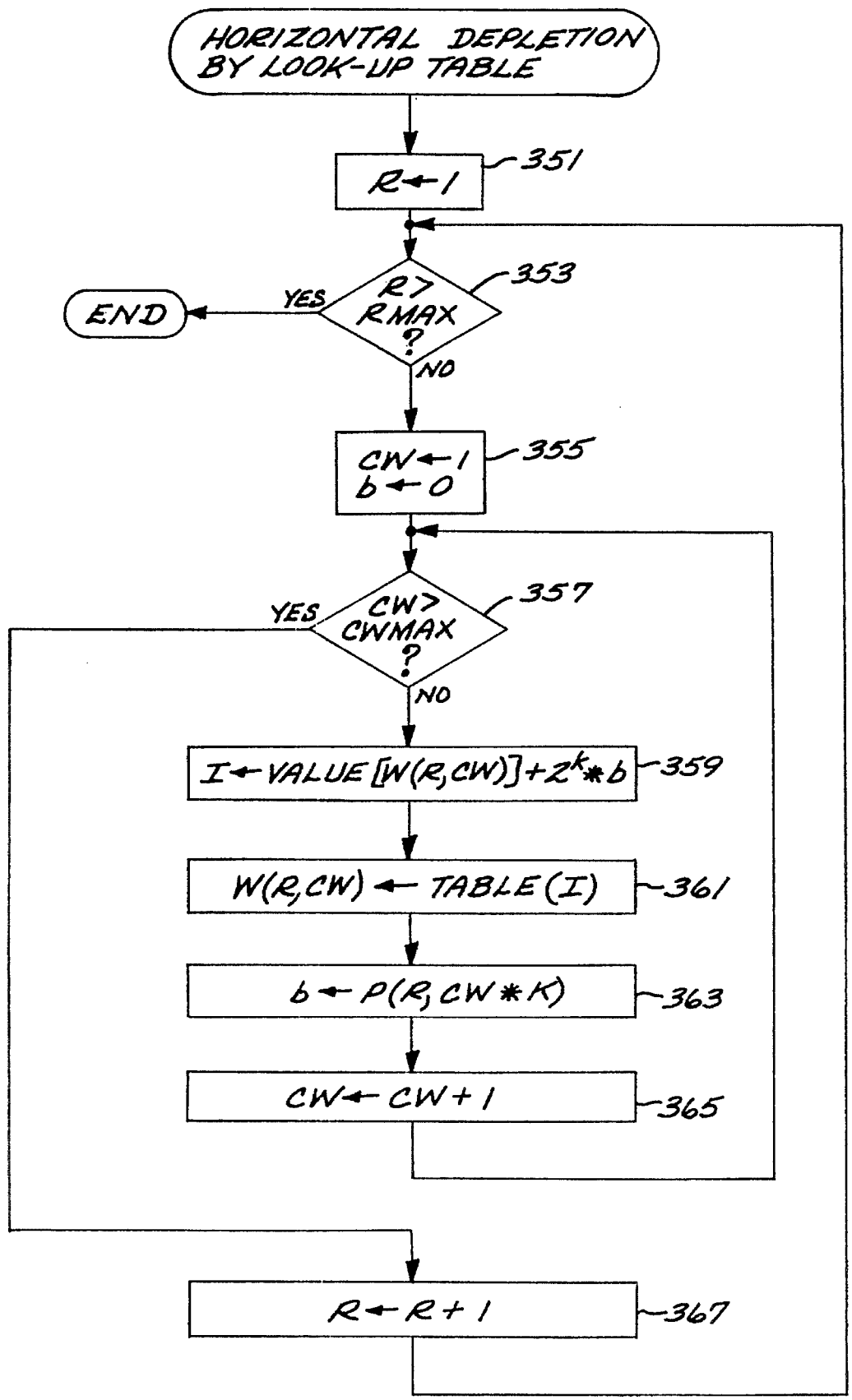
FIG. 11 sets forth a flow diagram of a procedure for performing horizontal depletion of raster data by use of a depleter look-up table.

Referring now to FIG. 11, set forth therein by way of illustrative example is a flow diagram of a procedure for horizontally depleting raster data by replacing K-bit words with depleted words retrieved from a look-up table. It should be appreciated that the row width of the raster data might result in bits at the end of each row that do not form a complete K-bit word. In accordance with conventional processing techniques, any unused bits in the rightmost word are padded with 0's. At 351 a row index R is initialized to 1. At 353 a determination is made as to whether the row index R has exceeded the number of rows RMAX in the raster data array. If the determination is no, the row index R has not exceeded the number of rows RMAX, at 355 a word array column index CW is initialized to 1, and a variable b, which will be used to store the additional bit for the depleter look-up table index I, is initialized to 0. At 357 a determination is made as to whether the word array column index CW has exceeded the number of word columns CWMAX. If no, at 359 the index I to the depleter look-up table is formed by adding $2^k$ to the composite binary value of the K-bit word W(R,CW). At 361 the word W(R, CW) is replaced with the K-bit word retrieved by accessing the depleter look-up table with the depleter look-up table index I. At 363, the contents of b is replaced with the contents of the rightmost bit P(R,CW*K) of the depleted word W(R, CW) with the pixel bits of the K-bit word array being identified as represented in FIG. 7. At 365 the word column index CW in incremented by one and control transfers to 357.

If the determination at 357 is yes, the word column index CW has exceeded the number of word columns CWMAX, control transfers to 367 where the row count R is incremented by one. Control then transfers to 353 where the row index R is checked to determine whether it has exceeded the number of rows RMAX. If the determination at 353 is yes, the row index R has exceeded the number of rows RMAX, the procedure ends.

The entries of the depleter table are readily determined, for example by generating every possible combination of K+1 bits and applying thereto the bit-by-bit horizontal depletion procedure discussed above relative to FIG. 8.

Enhanced Mode Raster Data Depletion

Enhanced mode raster data depletion is directed to depleting raster data at a particular resolution so that it can be printed on pixel array having the same resolution with a dot size that configured for a lower resolution and thus larger than would be utilized in printing the undepleted raster data. Pursuant to enhanced mode raster data depletion, the raster data is subjected to depletion along the horizontal axis, depletion along the vertical axis, and then a guard depletion wherein large fill-in areas are further depleted.

Horizontal depletion is performed in the same manner as for draft mode horizontal depletion.

Figure 12:
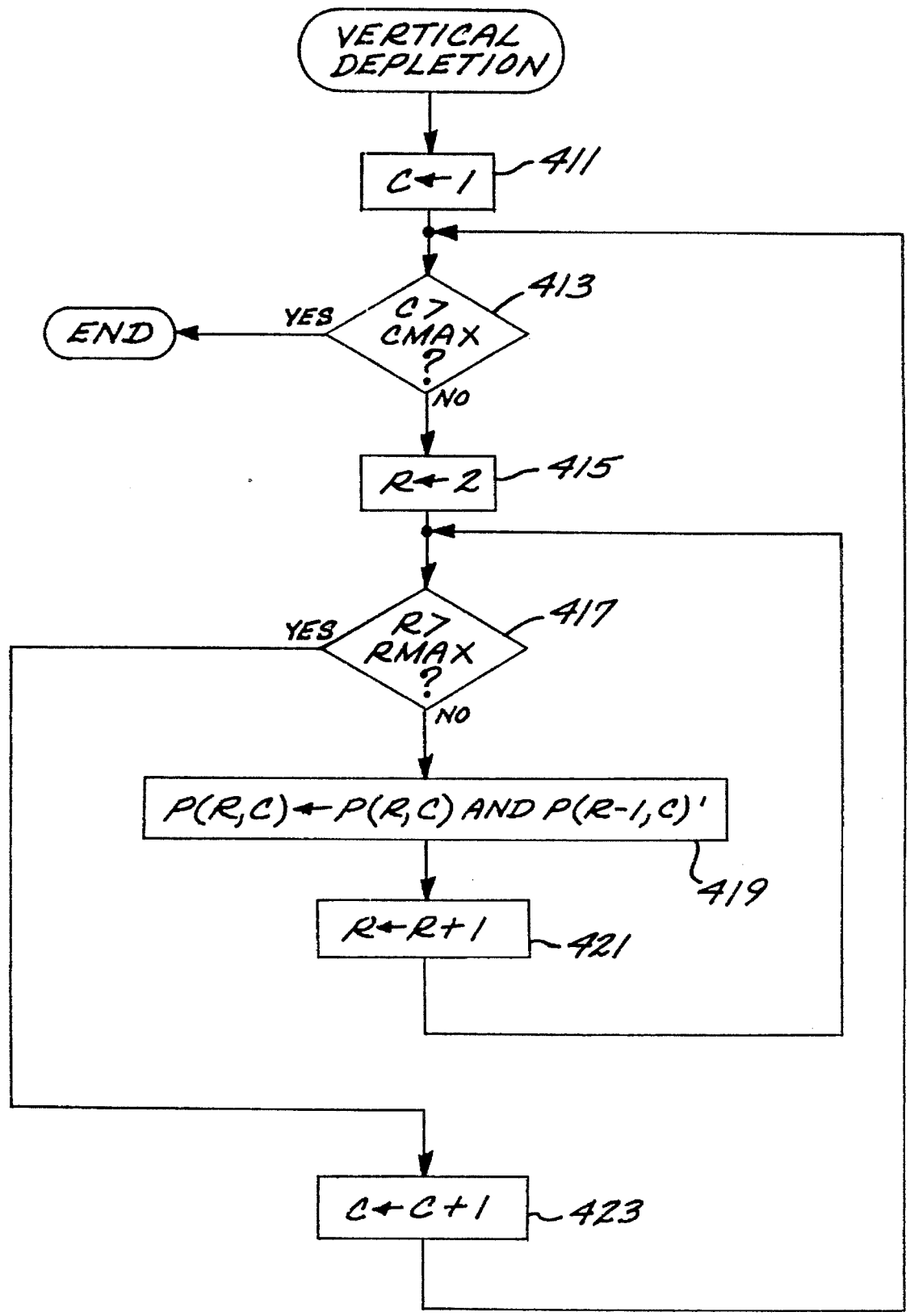
FIG. 12 sets forth a flow diagram of a procedure for performing vertical depletion of raster data.

Vertical depletion can be performed on each column in a manner similar to horizontal depletion on each row, for example, by sequentially examining each pixel bit in each column starting with the second pixel bit from the top, and turning off each pixel that has an "on" pixel immediately above it. FIG. 12 sets forth by way of illustrative example a flow diagram of a procedure for performing vertical depletion on each of the CMAX pixel columns of the raster data for an image. At 411 a pixel column index C is initialized to 1, and at 413 a determination is made as to whether the pixel column index C has exceeded the number of columns CMAX. If the determination is no, the pixel column index C has not been exceeded the number of pixel columns CMAX, a row index R is initialized to 2 at 415. At 417 a determination is made as to whether the row index R has exceeded the number of rows RMAX. If no, at 419 the pixel bit P(R,C) is replaced with the result of bitwise binary ANDing the present contents of the pixel bit P(R,C) with the binary 1's complement of the contents of the pixel bit P(R-1,C), which is above the pixel bit P(R,C). At 421 the row index R is incremented by one, and processing transfers to 417 where the row index R is checked as to whether it has exceeded the number of rows RMAX.

If the determination at 427 is yes, the row index R has exceeded the number of rows RMAX, control transfers to 423 where the column index C is incremented by one. Control then transfers to 413 where the column index C is checked to determine whether it has exceeded the number of columns CMAX. If the determination at 413 is yes, the column index C has exceeded the number of columns CMAX, the procedure ends.

Figure 13:
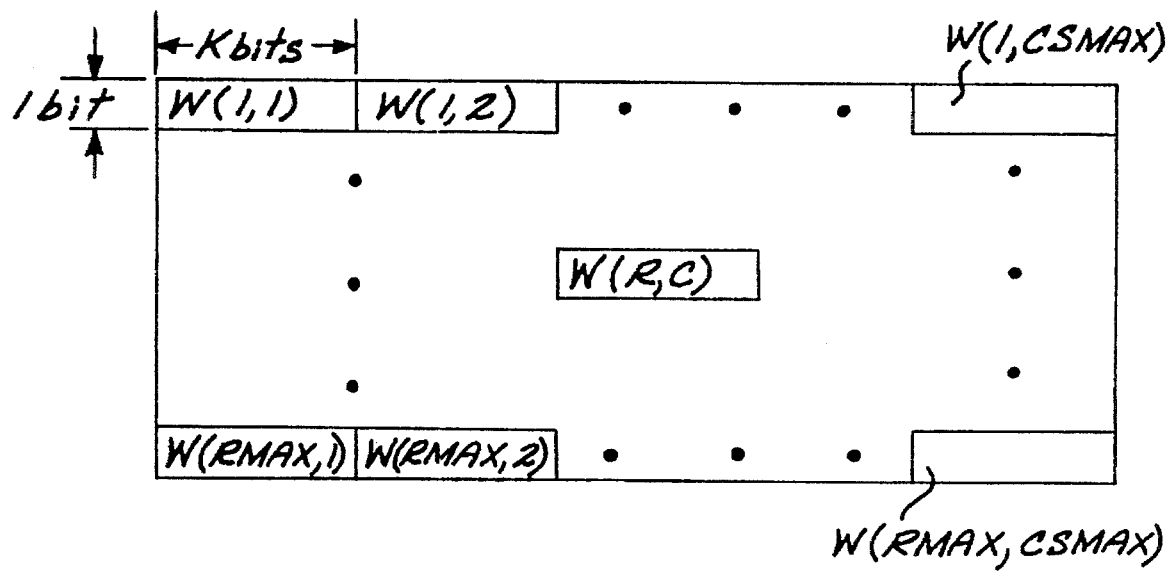
FIG. 13 schematically illustrates the organization of raster data into an array of K-bit wide words for vertical depletion.
Figure 14:
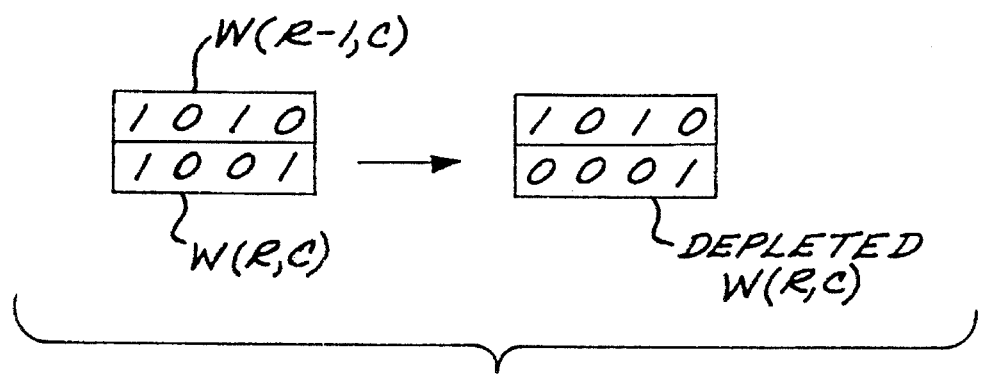
FIG. 14 schematically illustrates an example of vertical depletion of a word of raster data by replacement thereof with the result of bitwise binary ANDing the word to be depleted with the binary 1's complement of the overlying raster data word.

By way of further particular illustrative example, vertical depletion can be performed by organizing each row of pixel data as a series of immediately adjacent nonoverlapping K-bit wide words W(R,CW), as shown in FIG. 13 and in the same manner as discussed above relative to horizontal depletion by use of a depleter table, and replacing each K-bit word W(R,CW) with the K-bit result of bitwise binary ANDing the present value of the K-bit word W(R,CW) with the binary 1's complement of the overlying K-bit word W(R-1,C) that is in the prior row and at the same word column position. Since the lower of two vertically aligned words is being replaced, the K-bit words W(1,1) through W(1,CWMAAX) of the top row of raster data are not changed. FIG. 14 schematically illustrates vertically aligned 4-bit words W(R,C) and W(R-1,C), each of which comprises horizontally depleted data, and the resulting depleted word W(R,C).

Figure 15:
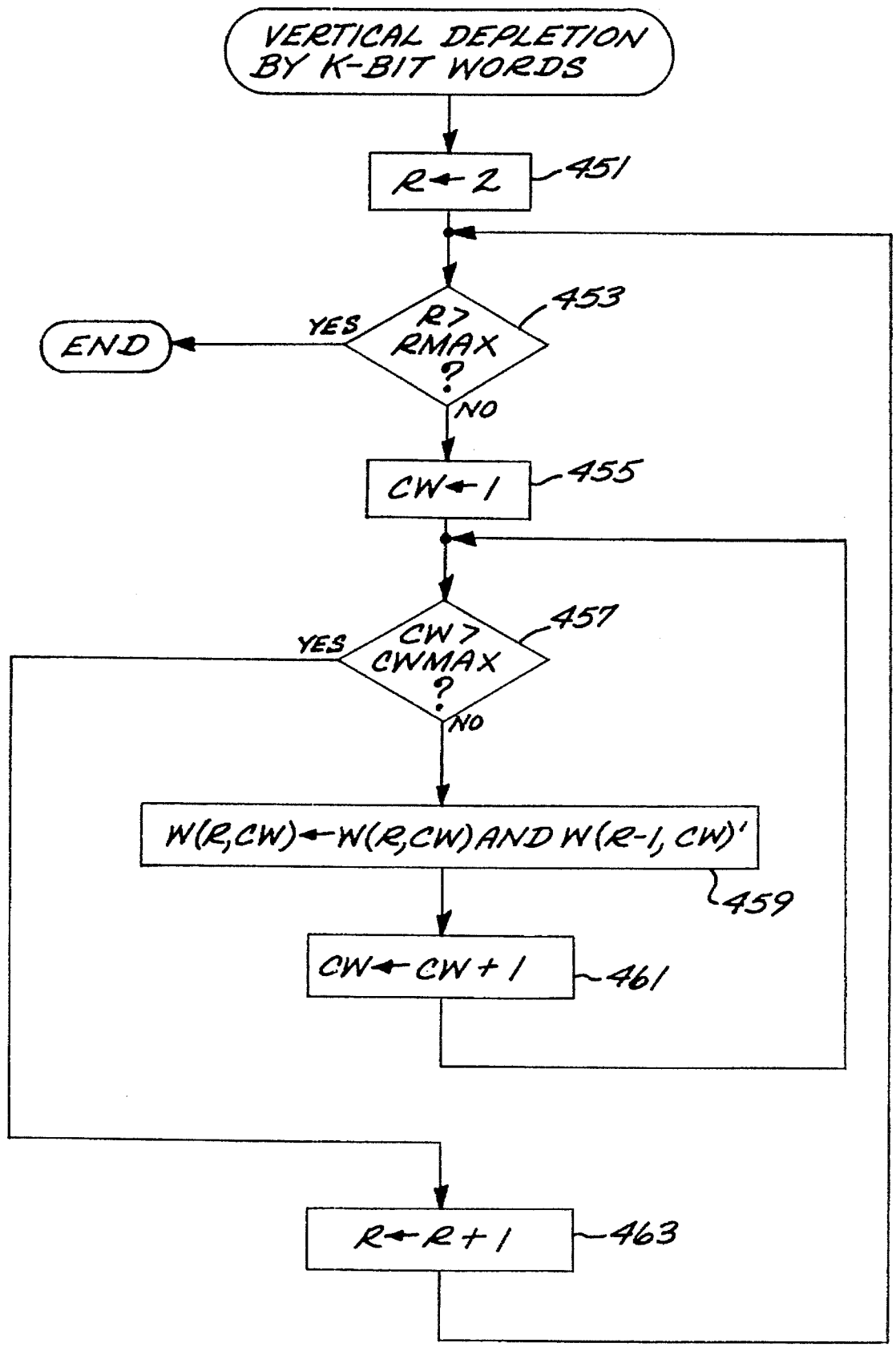
FIG. 15 sets forth a flow diagram of a procedure for performing vertical depletion of raster data by sequentially replacing raster data words with the results of bitwise binary ANDing a word to be depleted with the binary 1's complement of the overlying raster data word.

Referring now to FIG. 15, set forth therein by way of illustrative example is a flow diagram of a procedure for vertically depleting raster data by replacing K-bit words with depleted K-bit words which are the results of a bitwise binary logical operation between the K-bit word to be depleted and the overlying K-bit word that is in the immediately prior in sequence row and is in the same word column as the K-bit word to be depleted. It should be appreciated that the row width of the raster data might result in bits at the end of each row that do not form a complete word. In accordance with conventional processing techniques, any unused bits in the rightmost word are padded with 0's. At 451 a row index R is initialized to 2. At 453 a determination is made as to whether the row index R has exceeded the number of rows RMAX in the raster data array. If the determination is no, the row index R has not exceeded the number of rows RMAX, at 455 a word column index CW is initialized to 1. At 457 a determination is made as to whether the word column index CW has exceeded the number of word columns CWMAX in the raster data array. If no, at 459 the K-bit word W(R,CW) is replaced with the K-bit word obtained by bitwise binary ANDing the present contents of the word W(R,CW) with the binary 1's complement of the contents of the overlying K-bit word W(R-1, CW). At 461 the word column index CW in incremented by 1, and control transfers to 457.

If the determination at 457 is yes, the word column index CW has exceeded the number of word columns CWMAX, control transfers to 463 where the row index R is incremented by one. Control then transfers to 453 where the row index R is checked to determine whether it has exceeded the number of rows RMAX. If the determination at 453 is yes, the row index R has exceeded the number of rows RMAX, the procedure ends.

The depletion of raster data along respective axes is performed to avoid printing two or more immediately adjacent pixels along any axis. Thus, for the two dimensional case, depletion along the horizontal axis insures that a printed pixel will not have an immediately adjacent printed pixel that is in the same row. Similarly, depletion along the vertical axis insures that a printed pixel will not have an immediately adjacent printed pixel that is in the same column. For multiple axis depletion, depletion along each axis is performed sequentially, such that each depletion other than the first will be performed on partially depleted raster data.

Figure 16:
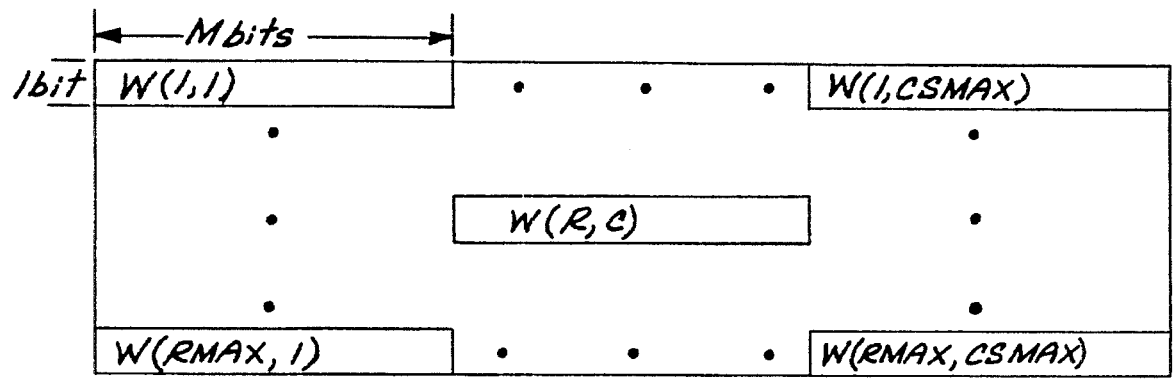
FIG. 16 schematically illustrates the organization of raster data into an array of M-bit wide words for guard depletion.
Figure 17:
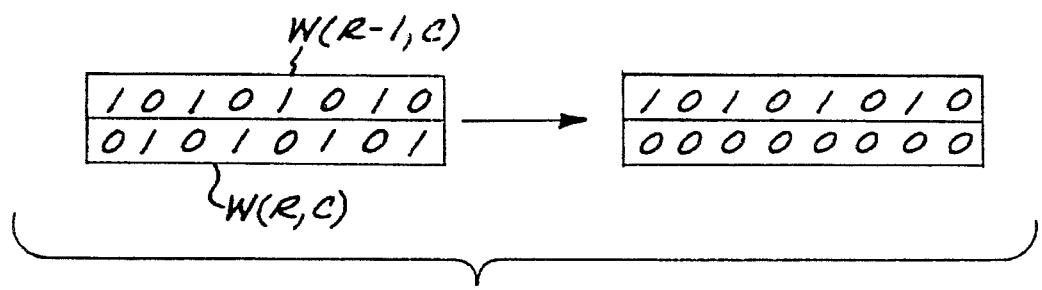
FIG. 17 schematically illustrates an example of vertically adjacent raster data words wherein one of the words would be set to all 0's pursuant to guard depletion.

After horizontal and vertical raster data depletion in accordance with the invention, there may be areas that are still too dense, as for example wherein the data of two adjacent rows of raster data are in the form of a checkerboard. Further depletion of such areas is achieved by considering each row of pixel data as a series of adjacent M-bit wide words W(R,CW), as shown in FIG. 16, in the same manner as discussed above relative to vertical depletion, and replacing each word W(R,CW) with all O's if bitwise binary ORing the word W(R,CW) with the overlying word W(R1, CW) results in an M-bit word that is all 1's. In other words, if the M-bit word W(R, CW) contains alternating 1's and the M-bit word W(R-1,CW) contains alternating 1's that are offset by one column relative to the alternating 1's of W(R,CW), then the lower M-bit word W(R, CW) is depleted to contain all 0's, as represented in FIG. 17.

Instead of checking the M-bit result of the bitwise binary OR operation for all 1's, the binary 1's complement of the M-bit result of bitwise binary ORing W(R,CW) with W(R-1,CW) can be checked to determine whether it has a value of zero, which avoids checking the individual bits of the result and therefore saves processing time. If the value of [W(R,CW) OR W(R-1,CW)]' is equal to 0, then the M-bit word W(R,CW) is replaced with an M-bit word containing all 0's.

Figure 18:
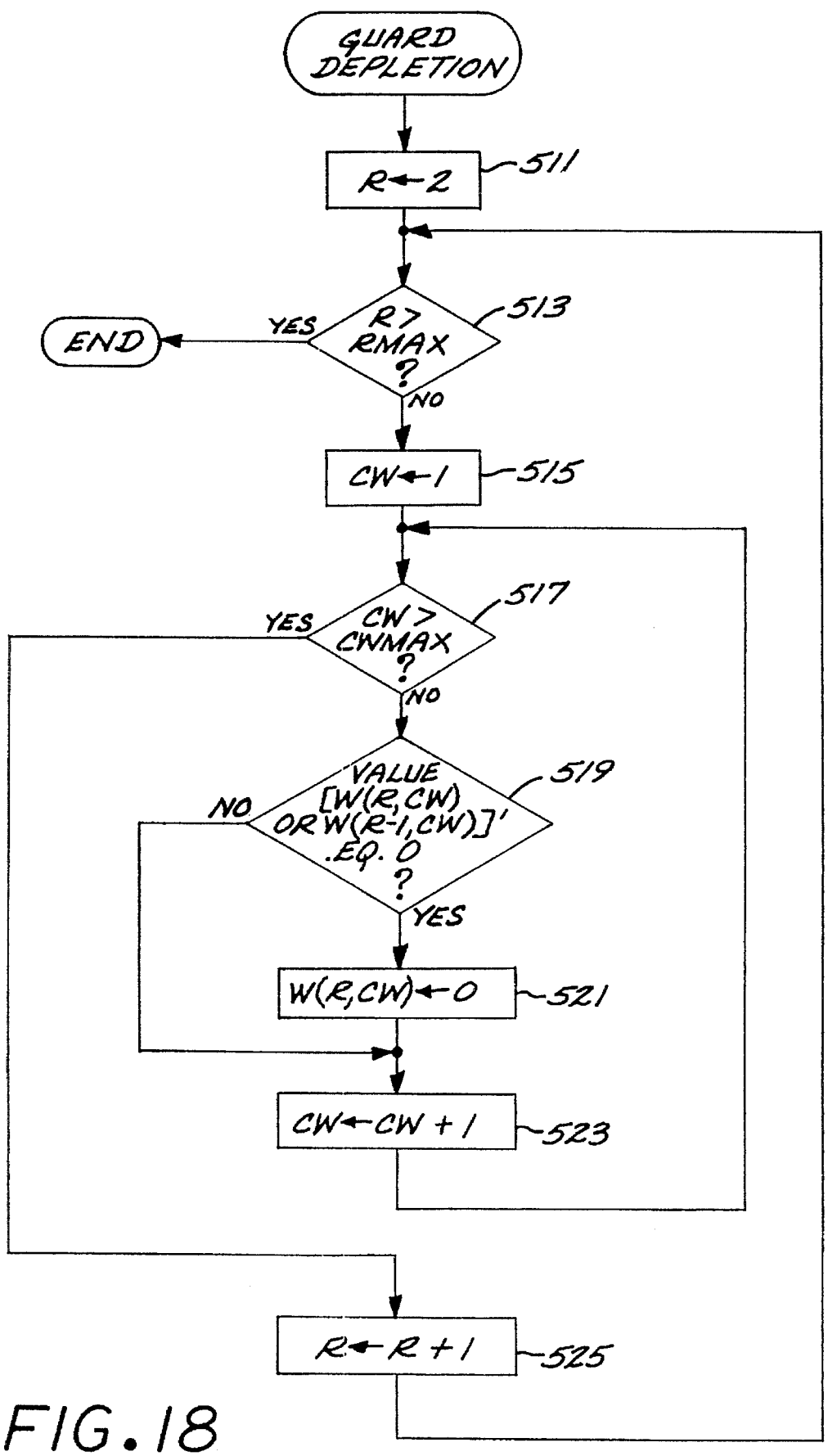
FIG. 18 sets forth a flow diagram for guard depletion of a raster data array.

Referring now to FIG. 18 set forth therein by way of illustrative example is a flow diagram of a guard depletion procedure in accordance with the invention. At 511 a row index R is initialized to 2. At 513 a determination is made as to whether the row index R has exceeded the number of rows RMAX in the raster data array. If the determination is no, the row index R has not exceeded the number of rows RMAX, at 515 a word column index CW is initialized to 1. At 517 a determination is made as to whether the word column index CW has exceeded the number of word columns CWMAX in the M-bit word array. If no, at 519 a determination is made as to whether the value of [W(R,CW) OR W(R1,CW)]' is equal to 0. If yes, the word W(R,CW) is set to all 0's at 521. At 523 the word column index CW in incremented by 1, and control transfers to 517.

If the determination at 519 is no, the value of the binary 1's complement of the result of bitwise binary ORing W(R,CW) with W(R-1,CW) is not equal to 0, control transfers to 523.

If the determination at 517 is yes, the word column index CW has exceeded the number of word columns CWMAX, control transfers to 525 where the row index R is incremented by one. Control then transfers to 513 where the row index R is checked to determine whether it has exceeded the number of rows RMAX. If the determination at 513 is yes, the row index R has exceeded the number of rows RMAX, the procedure ends.

Thus, pursuant to enhanced mode depletion, raster data having a particular resolution is depleted so that the depleted raster data can be printed on a pixel grid for that particular resolution with a dot size that is larger than the dot size that would otherwise be utilized with that particular resolution if depletion were not performed. For example, 600 dpi raster data is depleted in accordance with the invention so that the depleted data can be printed with 300 dpi dots.

Resolution Up Scaling

Figure 19:
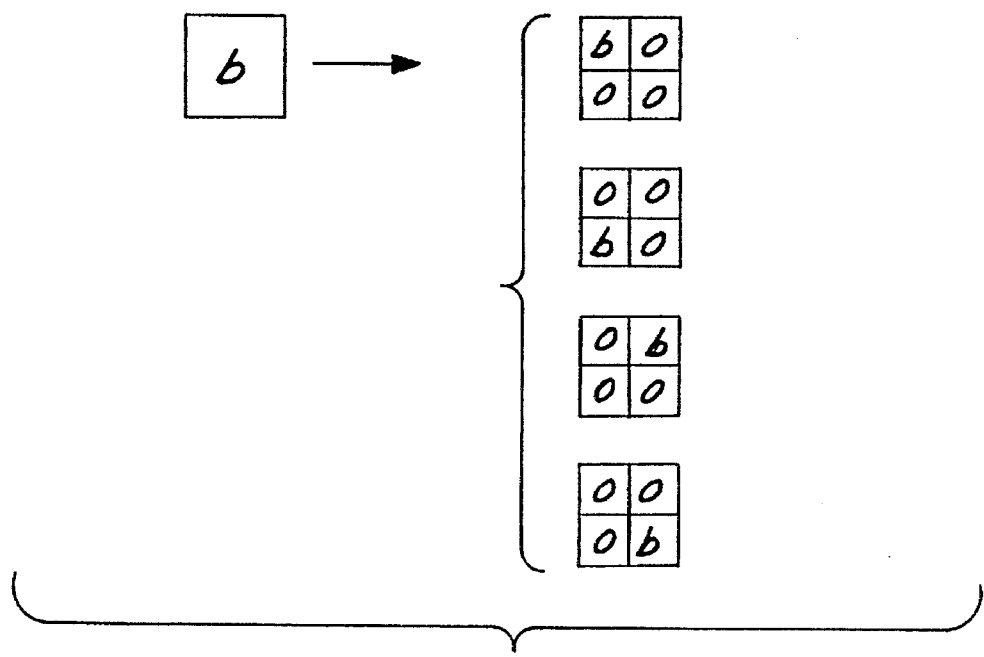
FIG. 19 schematically illustrates raster upscaling for one bit of original raster data.

Resolution expansion in accordance with the invention maps raster data at an original resolution to a higher resolution. In particular, each of the original resolution pixel data bits is mapped into an N×N bit cell whose bits contain the pixel data for an N×N subarray (i.e., N rows and N columns) of higher resolution pixels that has the same area as a pixel of the original resolution. The bit at a predetermined location in the N×N bit cell is assigned the value of the original pixel bit while the remaining bits in the N×N bit cell are 0's, with such predetermined bit location being the same for all bit cells. By way of illustrative example, for 300 dpi to 600 dpi up scaling, each 300 dpi pixel bit is are mapped into a 2×2 bit cell, and the predetermined location in each cell can be one of four locations, as shown in FIG. 19 for a 300 dpi pixel bit b. As also shown in FIG. 19, the remaining bits of the 2×2 cells are set to 0's. It should be appreciated that up scaling by a factor of N results in N×N bit cells in the up scaled raster data.

Resolution up scaled data resulting from the resolution up scaling of the invention will not be depleted when processed in accordance with the previously described enhanced mode depletion, and thus can be readily inserted into raster data having the higher resolution.

Figure 20:
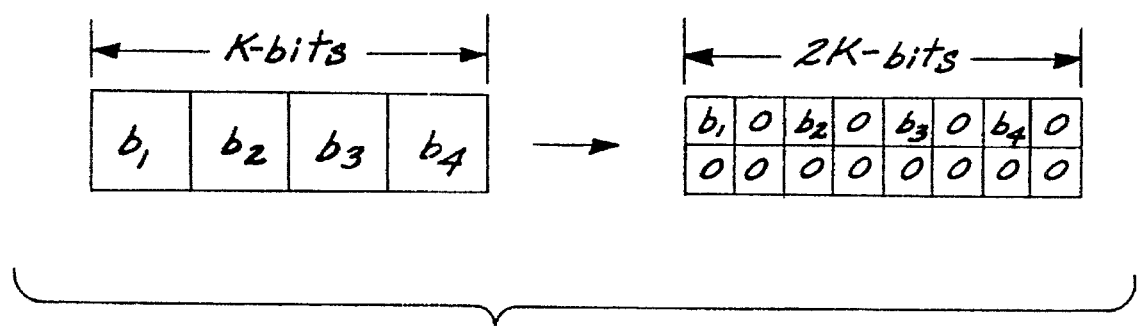
FIG. 20 schematically illustrates raster upscaling for a word of original raster data.
Figure 21:
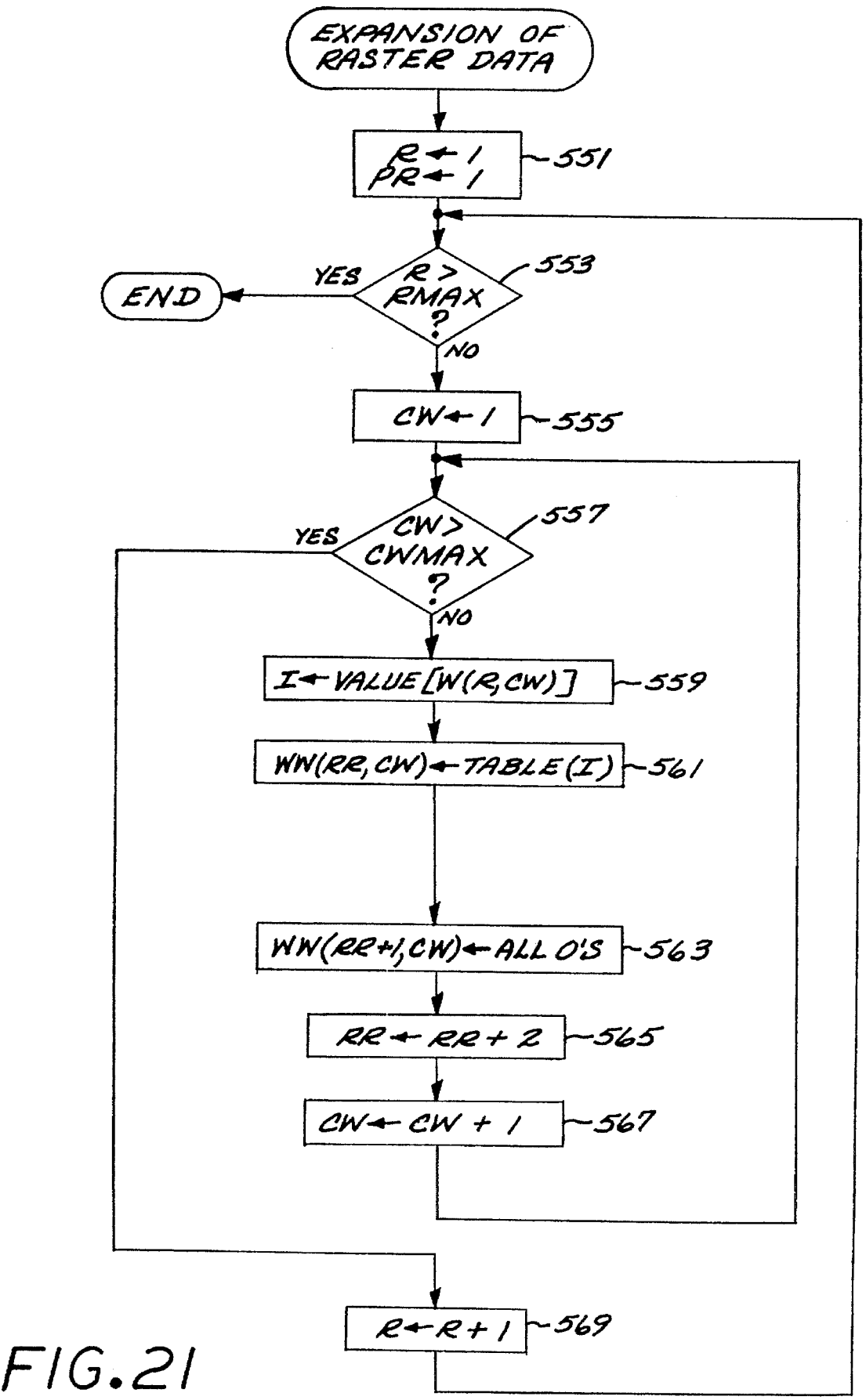
FIG. 21 sets forth a flow diagram for raster upscaling which is performed by use of a scaling look-up table.

By way of illustrative example, raster up scaling in accordance with the invention can be performed by organizing each row of the original raster data as a series of K-bit words W(R,C), for example in the same manner as discussed earlier relative to horizontal depletion by look-up table and schematically depicted in FIG. 9, and forming for each word of the original raster data a (N*K)-bit upscaled word that contains the bits in predetermined bit cell locations that are set to the contents of the bits of the originating original resolution word W(R,C). The upscaled (N,K)-bit word is conveniently retrieved from a scaling look-up table that is accessed by an index I comprised of the composite binary value of the original raster data word W(R,C). The N-1 (N*K)-bit words above or below the upscaled word retrieved from are padded with 0's. In other words, data for the rows of the up scaled data that contain the predetermined locations of the N×N bit cells, each of which corresponds to a bit in the original raster data, is retrieved from the scaling look-up table, while the remaining rows of the up scaled data are padded with 0's. FIG. 20 schematically depicts by way of illustrative example the up scaling of a 4-bit word, containing bits $b_1$, $b_2$, $b_3$, $b_4$, to an 8-bit word and an underlying 8-bit word of all 0's for the particular example wherein N=2 (e.g., 300 dpi to 600 dpi up scaling) and wherein the upper left bit in each 2×2 bit cell is the predetermined bit whose contents is set to correspond to the contents of the originating lower resolution pixel bit.

Referring now to FIG. 20, set forth therein by way of illustrative example is flow diagram of a procedure for up scaling in accordance with the invention for the particular example of upscaling to a higher resolution that is twice that of the original (e.g., 300 dpi to 600 dpi), and wherein the predetermined bit location in the upscaled bit cell is in the top row of each cell. An original raster data array having K-bit words arranged in a word array of RMAX rows and CWMAX columns is upscaled to an upscaled word array containing 2*K-bit words WW(RR, CW) arranged in an upscaled word array of 2*RMAX rows and CWMAX columns. At 551 a row index R for the original lower resolution raster data is initialized to 1, and a row index RR for the higher resolution raster data is initialized to 1. At 553 a determination is made as to whether the row index R has exceeded the number of rows RMAX in the originating lower resolution raster data array. If the determination is no, the row index R has not exceeded the number of rows RMAX, at 555 a word array column index CW is initialized to 1. At 557 a determination is made as to whether the word array column index CW has exceeded the number of word columns CWMAX. If no, at 559 the index I to the depleter look-up table is formed of the composite binary value of the K-bit word W(R,CW). At 561 the word WW(RR,CW) in the upscaled raster data array is replaced with the 2*K-bit word retrieved by accessing the scaling look-up table with the index I, and at 563 the word WW(RR+1,CW) in the upscaled raster data array is set to all 0's. At 565 the row index RR for the up scaled raster data array is incremented by 2. At 567 the word column index CW in incremented by one and control transfers to 557.

If the determination at 557 is yes, the word column index CW has exceeded the number of word columns CWMAX, control transfers to 569 where the row count R is incremented by one. Control then transfers to 553 where the row index R is checked to determine whether it has exceeded the number of rows RMAX in the original lower resolution raster data array. If the determination at 553 is yes, the row index R has exceeded the number of rows RMAX, the procedure ends.

Increased Resolution Printing Along Media Axis

In accordance with this aspect of the disclosure, an ink jet nozzle array having a nozzle pitch along the media axis that corresponds to a particular resolution (e.g., 1/300th of an inch for 300 dpi) is utilized to print on a grid having twice the resolution (i.e., 600 dpi which has resolution grid pitch of a 1/600th of an inch for the example of a nozzle pitch of 1/300th of an inch). Pursuant to increased resolution printing, the rows of a pixel array are printed in an interleaved manner wherein each row is printed on a different carriage scan than each of any adjacent rows.

By way of simplified example, the table of FIG. 22 identifies the pixel rows that are printed pursuant to a series of carriage scans of a four nozzle array having a dot pitch that is twice the dot pitch of the printed pixel array. The vertical axis identifies the row in the pixel array, and the horizontal axis identifies the scan of the carriage. An X at a particular location indicates that the pixel row indicated by the vertical axis is printed on the carriage scan identified by the horizontal axis. A circled pixel row number indicates that such row is printed by the nozzle that is first encountered by the media, and is useful in understanding the media advance procedure.

From the table of FIG. 22, it should be appreciated that the rows printed on each scan of the carriage are as follows:

Scan 1: 1, 3
Scan 2: 2, 4, 6, 8
Scan 3: 5, 7, 9, 11
Scan 4: 10, 12, 14, 16

For the particular example illustrated by the table of FIG. 22, the nozzle array is initially positioned so that on the first pass one-half of the nozzles print alternating rows starting with the first row. The media is advanced by 5 dot pitches for the second pass, 3 dot pitches for the second pass, 5 dot pitches for the next, and so forth.

More generally, for a nozzle array having N nozzles adjacent to each other along the media axis and spaced apart along the media axis by a nozzle pitch P, for the first carriage scan the media is advanced to align the leading M nozzles of the nozzle array with pixel row 1 and succeeding alternating pixels rows through the (2M−1)th pixel row, wherein pitch of the pixel rows along the media axis is P/2 and wherein the M leading nozzles are nozzles first encountered by the advance of the media and M is less than or equal to N. For the second and subsequent carriage scans, the media is advanced by 2(N−M)+1 pixels rows and 2M-1 pixel rows in an alternating manner.

Figure 23:
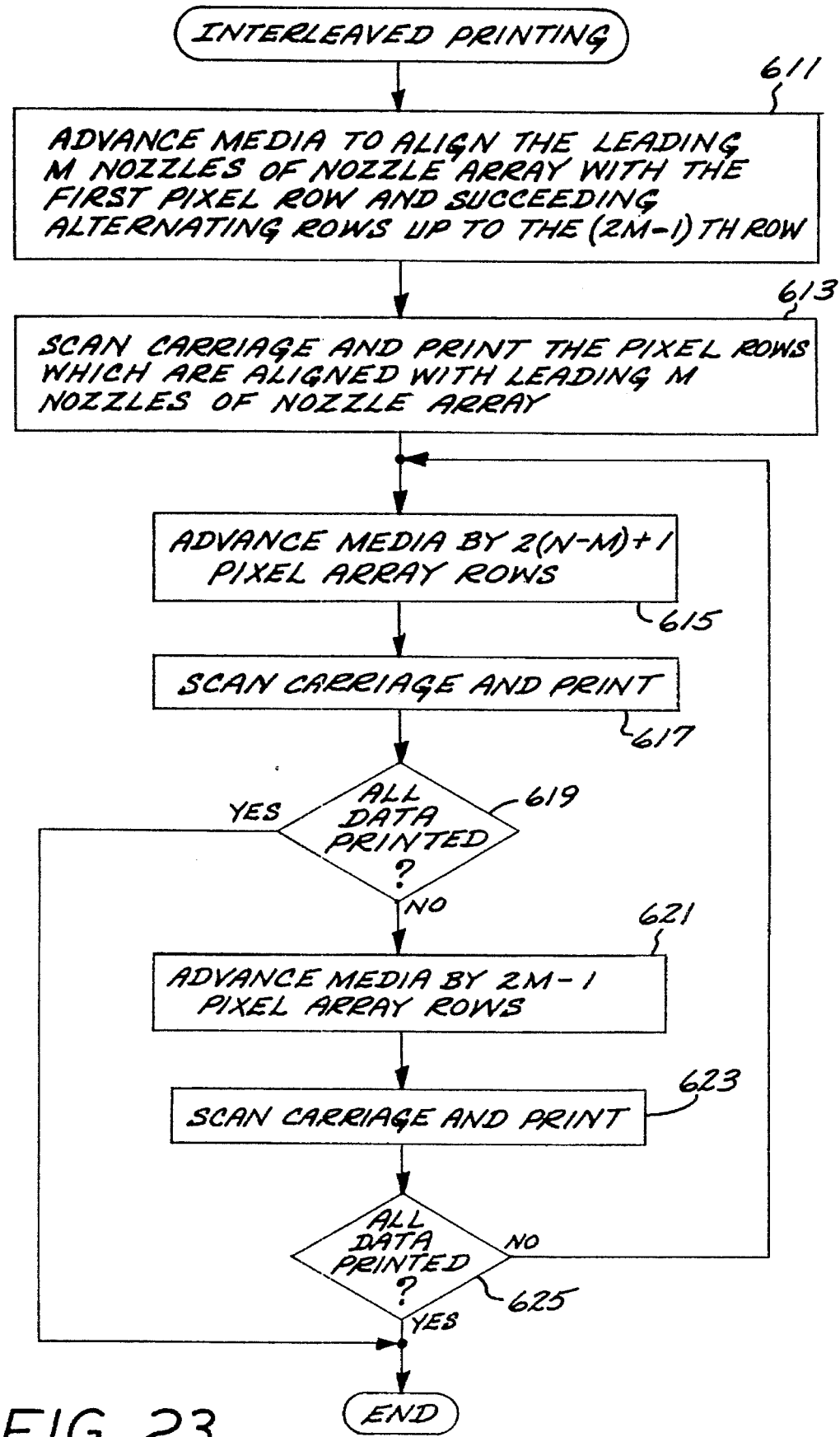
FIG. 23 sets forth a flow diagram of a printing procedure for printing a pixel array with a nozzle array having a nozzle pitch that is twice the row pitch of the pixel array.

Referring now to FIG. 23 set forth therein by way of illustrative example of increased resolution printing in accordance with the invention. At 611, the print media is advanced to align the leading M nozzles with the first pixel row and succeeding alternating pixel rows up to the (2M−1)th pixel row. At 613, the carriage scanned to print the pixel rows aligned with the leading M nozzles. At 615 the print media is advanced 2(N−M)+1 pixels rows, and at 617 the carriage is scanned to print pixel rows aligned with the nozzles of the nozzle array. At 619 a determination is made as to whether all of the raster data has been printed. If yes, the procedure ends.

If the determination at 619 is no, all the raster data has not been printed, at 621 the print media is advanced by 2M-1 pixel rows, and at 623 the carriage is scanned to print pixel rows aligned with the nozzles of the nozzle array. At 625 a determination is made as to whether all of the raster data has been printed. If yes, the procedure ends. If the determination at 625 is no, all the raster data has not been printed, control transfers to 615.

Although the foregoing has been a description and illustration of specific embodiments of the invention, various modifications and changes thereto can be made by persons skilled in the art without departing from the scope and spirit of the invention as defined by the following claims.

What is claimed is:

1. A method of operating a swath type printer to print pixel rows of a rectilinear pixel array having pixels arranged in pixel rows and pixel columns respectively aligned with the carriage axis and the media axis, the pixel array having a pixel row pitch along the media axis that is one-half the predetermined nozzle pitch, the swath type printer having a movable carriage that is movable along a carriage axis and a thermal ink jet nozzle array supported by the movable carriage for printing onto a print media that is selectively movable along a media axis, the nozzle array having at least N nozzles adjacent to each other along the media axis and spaced apart along the media axis by a predetermined nozzle pitch, the method comprising the steps of:

(A) advancing the print media to align leading M nozzles of the array with a first and succeeding alternating pixel rows to be printed up to an (M+1)th pixel row, wherein M is not greater than N and the leading M nozzles are those first encountered by advance of the print media;

(B) scanning the carriage and printing the pixel rows aligned with the leading M nozzles of the array;

(C) advancing the media by 2(N-M)+1 pixel rows; and (D) scanning the carriage and printing the pixel rows aligned with the N nozzles of the array.

2. The method of claim 1 wherein N is an even number.

3. The method of claim 2 wherein M is equal to N/2.

4. The method of claim 1 wherein N is an odd number.

5. A method of operating a swath type printer to print pixel rows of a rectilinear pixel array having pixels arranged in pixel rows and pixel columns respectively aligned with the carriage axis and the media axis, the pixel array having a pixel row pitch along the media axis that is one-half the predetermined nozzle pitch, the swath type printer having a movable carriage that is movable along a carriage axis and a thermal ink jet nozzle array supported by the movable carriage for printing onto a print media that is selectively movable along a media axis, the nozzle array having at least N nozzles adjacent to each other along the media axis and spaced apart along the media axis by a predetermined nozzle pitch, the method comprising the steps of:

(A) advancing the print media to align leading M nozzles of the array with a first and succeeding alternating pixel rows to be printed up to an (M+1)th pixel row, wherein M is less than N and the leading M nozzles are those first encountered by advance of the print media;

(B) scanning the carriage and printing the pixel rows aligned with the leading M nozzles of the array;

(C) advancing the media by 2(N-M)+1 pixel rows;

(D) scanning the carriage and printing the pixel rows aligned with the N nozzles of the array;

(E) advancing the media by 2M-1 pixel rows; and (F) scanning the carriage and printing the pixel rows aligned with the N nozzles of the array.

6. The method of claim 5 wherein N is an even number.

7. The method of claim 6 wherein M is equal to N/2.

8. The method of claim 5 wherein N is an odd number.

9. A method of operating a swath type printer to print pixel rows of a rectilinear pixel array having pixels arranged in pixel rows and pixel columns respectively aligned with the carriage axis and the media axis, the pixel array having a pixel row pitch along the media axis that is one-half the predetermined nozzle pitch, the swath type printer having a movable carriage that is movable along a carriage axis and a thermal ink jet nozzle array supported by the movable carriage for printing onto a print media that is selectively movable along a media axis, the nozzle array having at least N nozzles adjacent to each other along the media axis and spaced apart along the media axis by a predetermined nozzle pitch, the method comprising the steps of:

(A) advancing the print media to align leading M nozzles of the array with a first and succeeding alternating pixel rows to be printed up to an (M+1)th pixel row, wherein M is less than N and the leading M nozzles are those first encountered by advance of the print media;

(B) scanning the carriage and printing the pixel rows aligned with the leading M nozzles of the array;

(C) advancing the media by 2(N-M)+1 pixel rows;

(D) scanning the carriage and printing the pixel rows aligned with the N nozzles of the array;

(E) terminating printing if all rows of the pixel array have been printed;

(F) advancing the media by 2M-1 pixel rows;

(G) scanning the carriage and printing the pixel rows aligned with the N nozzles of the array;

(H) terminating printing if all rows of the pixel array have been printed; and (I) repeating steps (C) through (H) until all rows of the pixel array have been printed.

10. The method of claim 9 wherein N is an even number.

11. The method of claim 10 wherein M is equal to N/2.

12. The method of claim 9 wherein N is an odd number.

13. A method of operating a swath type printer to print pixel rows of a rectilinear pixel array having pixels arranged in rows and columns respectively aligned with the carriage axis and the media axis, the pixel array having a pixel row pitch along the media axis that is one-half the predetermined nozzle pitch, the swath type printer having a movable carriage that is movable along a carriage axis and a thermal ink jet nozzle array supported by the movable carriage for printing onto a print media that is selectively movable along a media axis, the nozzle array having at least N nozzles adjacent to each other along the media axis and spaced apart along the media axis by a predetermined nozzle pitch, the method comprising the steps of:

(A) advancing the print media to align a plurality of the nozzles of the nozzle array with a first plurality of alternating pixel rows;

(B) scanning the carriage and printing the first plurality of alternating pixel rows;

(C) advancing the print media to align a plurality of the nozzles with a second plurality of alternating pixel rows including pixel rows interposed between the rows of the first plurality of rows; and (D) scanning the carriage and printing the second plurality of alternating pixel rows, whereby a plurality of adjacent pixel rows are printed in an interleaved manner.

* * * * *